(12) United States Patent
Hender et al.

(10) Patent No.: US 10,089,854 B2
(45) Date of Patent: Oct. 2, 2018

(54) ALERT GENERATION SYSTEM AND METHOD

(75) Inventors: Adam Jamie Hender, Perth (AU); Mark Oliver Carniello, Duncraig (AU); Simon Matthew Taylor, Perth (AU); Fernando Andres Cosa, Perth (AU); Carlos Enrique Kruger, Perth (AU); Damian Paul Slee, Perth (AU)

(73) Assignee: IINTEGRATE SYSTEMS PTY LTD, Perth (AU)

( * ) Notice: Subject to any disclaimer, the term of this patent is extended or adjusted under 35 U.S.C. 154(b) by 98 days.

(21) Appl. No.: 12/736,732

(22) PCT Filed: Sep. 24, 2009

(86) PCT No.: PCT/AU2009/001266
§ 371 (c)(1),
(2), (4) Date: Nov. 4, 2010

(87) PCT Pub. No.: WO2010/034060
PCT Pub. Date: Apr. 1, 2010

(65) Prior Publication Data
US 2011/0060705 A1 Mar. 10, 2011

(30) Foreign Application Priority Data
Sep. 24, 2008 (AU) ................ 2008904973

(51) Int. Cl.
*G08B 23/00* (2006.01)
*G06N 5/00* (2006.01)
(52) U.S. Cl.
CPC .............. *G08B 23/00* (2013.01); *G06N 5/00* (2013.01)

(58) Field of Classification Search
CPC ........ G08B 23/00; G08B 21/12; G06N 5/046; G06N 5/047; G06N 5/048; G06N 5/045; G06N 5/043; G01V 1/008; G01S 19/23; G01W 1/00
See application file for complete search history.

(56) References Cited

U.S. PATENT DOCUMENTS

| | | |
|---|---|---|
| 5,261,044 A | 11/1993 | Dev et al. |
| 6,073,089 A | 6/2000 | Baker et al. |
| 6,356,885 B2 | 3/2002 | Ross et al. |
| 6,393,386 B1 | 5/2002 | Zager et al. |

(Continued)

FOREIGN PATENT DOCUMENTS

WO WO 2002/039351 5/2002

OTHER PUBLICATIONS

'Model system of earthquake prediction and countermeasures': Chengye, IEEE, 1990 10.1109/ISUMA.*

(Continued)

*Primary Examiner* — Robert A Cassity
*Assistant Examiner* — Peter D Coughlan
(74) *Attorney, Agent, or Firm* — Nixon & Vanderhye P.C.

(57) ABSTRACT

A system (10) for receiving measurement data wherein there is a processing means of the measurement data to create or update at least two models (28) where each model is a representation of a real-world object, event or phenomenon. There is a means for processing the characteristics (32) of the models to establish relationships (34) between the models and to generate alarms (40) when the relationships meet a certain criteria.

41 Claims, 19 Drawing Sheets

(56) References Cited

U.S. PATENT DOCUMENTS

| | | | |
|---|---|---|---|
| 6,753,784 B1 | 6/2004 | Sznaider et al. | |
| 7,096,074 B2 | 8/2006 | Yulevitch et al. | |
| 7,103,874 B2 | 9/2006 | McCollum et al. | |
| 7,277,797 B1* | 10/2007 | Kunitsyn et al. | 702/15 |
| 7,602,285 B2 | 10/2009 | Sznaider et al. | |
| 2001/0051937 A1* | 12/2001 | Ross et al. | 706/47 |
| 2005/0010365 A1* | 1/2005 | Chapman et al. | 702/3 |
| 2005/0096944 A1* | 5/2005 | Ryan | G06Q 40/08 705/4 |
| 2006/0106743 A1* | 5/2006 | Horvitz | 706/21 |
| 2006/0176169 A1* | 8/2006 | Doolin et al. | 340/521 |
| 2006/0235650 A1 | 10/2006 | Vinberg et al. | |
| 2006/0241853 A1* | 10/2006 | Gadler | 701/201 |
| 2007/0202927 A1* | 8/2007 | Pfleging et al. | 455/567 |
| 2007/0214023 A1* | 9/2007 | Mathai et al. | 705/4 |
| 2007/0275473 A1 | 11/2007 | Swanson | |
| 2008/0034030 A1* | 2/2008 | Toohey | G06Q 10/00 709/203 |
| 2008/0046134 A1* | 2/2008 | Bruce et al. | 701/1 |
| 2008/0055096 A1* | 3/2008 | Aylward | 340/601 |
| 2008/0077474 A1* | 3/2008 | Dumas | G06Q 10/00 705/7.12 |
| 2008/0114612 A1* | 5/2008 | Needham et al. | 705/1 |
| 2008/0154829 A1* | 6/2008 | Dalton | G06K 9/00785 706/46 |
| 2008/0177688 A1* | 7/2008 | Friedlander et al. | 706/46 |
| 2010/0013629 A1 | 1/2010 | Sznaider et al. | |

OTHER PUBLICATIONS

'Real time prediction of earthquake ground motions and structural responses by statistic and fuzzy logic': Kawamura, IEEE, 1990, 10.1109/ISUMA.*

International Search Report for PCT/AU2009/001266, dated Nov. 27, 2009.

Written Opinion for PCT/AU2009/001266, dated Nov. 27, 2009.

International Preliminary Report on Patentability dated Sep. 20, 2010.

* cited by examiner

ALERT GENERATION SYSTEM AND METHOD

This application is the U.S. national phase of International Application No. PCT/AU2009/001266 filed 24 Sep. 2009 which designated the U.S. and claims priority to AU Patent Application No. 2008904973 filed 24 Sep. 2008, the entire contents of each of which are hereby incorporated by reference.

FIELD OF THE INVENTION

The present invention relates to processing measurements to generate an alert in certain circumstances.

BACKGROUND

It is useful to monitor objects and events. In many monitoring situations, most of what is monitored is mundane and does not require attention. However sometimes events occur that may require attention. Determining when to draw an event to someone's attention is a difficult task that is not currently handled adequately.

SUMMARY OF THE INVENTION

According to the present invention there is provided in a processing system a method comprising:
  receiving measurement data;
  processing the measurement data to create or update at least two models and one or more characteristics associated with each model based on the measurement data, where each of the models is a representation of a real-world thing;
  processing the characteristics associated with the models to form one or more relationships between the models when the characteristics are such that two or more of the models are regarded as being related according to one or more relationship criteria;
  processing the relationships to generate one or more alerts when one or more of the relationships meet one or more alert criteria.

The real-world thing is typically a real-world object, event or phenomenon.

According to the present invention there is provided in a method comprising:
  categorising the received measurement data as related to one or more models, wherein each of the one or more models is a representation of a real-world thing, wherein one or more of the models have one or more associated characteristics that are based on the related measurement data;
  forming one or more relationships between the models when the characteristics are such that two or more of the models are regarded as related according to one or more relationship criteria;
  generating one or more alerts when one or more of the relationships meet one or more alert criteria.

The measurement data typically originates from one or more instruments or sensors and typically comprises a measurement from the sensor, information about the sensor (such as an identifier of the sensor) and a time that the measurement was taken. A measurement may be an observation taken at a particular location.

The models may have other associated characteristics based on definitional data of the modelled real-world thing. The definitional data may be metadata related to the measurement data.

The relationship criteria typically comprise rules which define when two or more models are related according to the respective model characteristics.

In an embodiment one or more of the relationships have one or more properties that are based on the model characteristics or the measurement data related to the model in the respective relationship. Generating the one or more alerts occurs when one or more of the relationship properties meet one or more of the alert criteria.

The alert criteria typically comprise rules which define when one of the relationships is significant according to the respective relationship properties.

In an embodiment one or more of the characteristics comprise a current state of the real-world thing. Typically the current state of the real-world thing is derived or inferred from measurement data related to the respective models. In some embodiments the current state is a component of the measurement data.

In an embodiment each model has one or more associated states, each state is updated when there is change in the measurement data related to the respective model. Updating a state of a model may change the state or leave it unchanged. An associated state of a model may be updated when there is a change in another model characteristic or in a relationship property or when an alert is generated.

In an embodiment one or more of the relationship properties comprise a current state of the relationship between one real-world thing and another real-world thing. Typically the current state of the relationship is derived or inferred from measurement data related to the respective models that have the respective relationship and/or characteristics of the respective models.

In an embodiment each relationship has one or more associated states, each state is updated when there is change in one or more of the respective models that form the relationship. Updating the state of a relationship may change the state or leave it unchanged. An associated state of a relationship may be updated when there is a change in a model characteristic or in another relationship property or when an alert is generated.

In an embodiment at least a portion of the measurement data has a geographic or geo-spatial significance of the real-world thing.

In an embodiment one of the characteristics associated with each model is a geographic location of the real-world thing represented by the model.

In an embodiment one of the characteristics associated with each model is a geographic extent of the real-world thing represented by the model.

In an embodiment one of the characteristics associated with each model is a time at which one or more of the other characteristics are valid. For example, the time may be when a measurement is taken, such that the measurement is valid as at that time, but the measurement might not be valid later because circumstances may have changed.

In an embodiment, generation of the alert triggers sending a notification to an actor. In an embodiment a notification is sent to an actor when one or more alerts are generated and notification criteria are met. In an embodiment the actor is a person, alternatively the actor may be a computer system. In an embodiment a notification may only be triggered when a plurality of alerts are generated.

Sometimes a new model will need to be created when new measurement data is received. In an embodiment the method further comprises creating a new model in the event that the received measurement data meet trigger criteria for creation of a model representing a real-world thing.

In an embodiment, processing the measurement data to be categorised as being related to one or more models comprises creating a new model in the event that a model related to the measurement data does not exist.

In an embodiment the method further comprises assigning characteristics to the new model based on the measurement data. In an embodiment the new model is selected from a plurality of predetermined model types according to the measurement data.

In an embodiment, processing the measurement data to be categorised as being related to one or more models comprises identifying which of a plurality of existing models the measurement data relates to. In an embodiment the method further comprises updating one or more characteristics related to the or each identified model based on the measurement data. In an embodiment updating one or more characteristics comprises updating the one or more characteristics only when there is a change in the measurement data related to the respective identified model.

In an embodiment the method further comprises terminating a model in the event that the measurement data indicates that the real-world thing that the model represents is no longer measured or the real-world thing no longer exists.

In an embodiment a graphical representation of one or more of the models is displayed. In an embodiment a graphical representation of one or more of the relationships is displayed.

Sometimes a new model will need to be created when characteristics of one or more other models require a composite or derivative model. In an embodiment the method further comprises creating a new model in the event that the model characteristics meet one or more model creation criteria for creation of a new model representing a real-world thing.

In an embodiment the method further comprises creating a new model in the event that the characteristics meet one or more model creation criteria and a model of the real-world thing does not exist.

In an embodiment the method further comprises assigning new characteristics to the new model based on the characteristics of the one or more models that caused the creation of the new model. In an embodiment the new model is selected from a plurality of predetermined model types according to the characteristics of the one or more models that caused the creation of the new model. In an embodiment the one or more of the model creation criteria are met when the characteristics of existing models change to a state such that the new model should be created. In one example two existing models may be combined into the new model.

The model creation criteria allow for models to be created based on inferences, interpolations, or derivations of characteristics of other models.

Characteristics of one model may update the characteristics of another model. In an embodiment the method further comprises identifying which of a plurality of existing models the characteristics of one or more other models relate to when the characteristics of the one or more other models meet one or more model update criteria. In an embodiment the method further comprises updating one or more characteristics related to the or each identified model based on the characteristics of the one or more other models. In an embodiment updating one or more characteristics comprises updating the one or more characteristics only when there is a change in the characteristics of the one or more other models. The model update criteria may be the same as the model creation criteria, in that a new model may be created and an existing model updated when the criteria are met.

The model update criteria allow for models to be updated based on inferences, interpolations, or derivations of characteristics of other models.

Certain relationships may trigger the creation of new models. In an embodiment the method further comprises creating a new model in the event that the relationship properties meet one or more other model creation criteria and a model related to the real-world things represented by the models does not exist. In an embodiment the method further comprises assigning characteristics to the new model based on the relationship properties. In an embodiment the new model is selected from a plurality of predetermined model types according to the relationship properties.

The other model creation criteria allow for models to be created based on inferences, interpolations, or derivations of properties of relationships between other models.

In an embodiment the method further comprises identifying which of a plurality of existing models the relationships relate to when the relationship properties meet one or more other model update criteria. In an embodiment the method further comprises updating one or more characteristics related to the or each identified model based on the relationship properties. In an embodiment updating one or more characteristics comprises updating the one or more characteristics only when there is a change in the relationship properties related to the respective identified model. The other model creation criteria may be the same as the other model update criteria, in that a new model may be created and an existing model updated when the other criteria are met.

The other model update criteria allow for models to be updated based on inferences, interpolations, or derivations of properties of relationships between other models.

In an embodiment one or more characteristics of each model is altered with time. In an embodiment the alteration is a change of a first state to a second state in the event that the respective characteristic is not updated within a time period. In an embodiment the second state is an indication of the model expiring, such that the model is no longer valid and may be deleted.

In an embodiment one or more relationship properties is altered with time. In an embodiment the alteration is a change of a first type of relationship property to a second type of relationship property in the event that the respective relationship is not updated with a time period. In an embodiment the second type of relationship is an indication of the relationship expiring, such that the relationship is no longer valid and may be deleted.

In an embodiment the notification comprises a message to the actor, wherein the message comprises information derived from one or more of: the relationship properties related to a model which caused the one or more alerts, the characteristics of the models in the relationship which caused the alert, or the measurement data on which the characteristics are based that were used to form the relationship which caused the one or more alerts.

In an embodiment updating of the model characteristics is event driven according to updates to the measurement data.

In an embodiment updating of the relationship properties is event driven according to updates to the model characteristics.

Also according to the present invention there is provided a system comprising:

an input for receiving measurement data;

a model processor for creating one or more models based on the received measurements data and for maintaining one or more characteristics of the models based on the measurement data, wherein each of the one or more models is a representation of a real-world thing;

a relationship processor for forming one or more relationships between the models when one or more of the characteristics are such that two or more of the models are regarded as being related according to one or more relationship criteria;

an alert processor for generating one or more alerts when one or more of the relationships meet one or more alert criteria.

In an embodiment the system further comprises a received data processor for categorising the measurement data as being related to one or more models.

In an embodiment the system further comprises a memory for maintaining a record of the one or more characteristics and properties of the one or more relationships.

In an embodiment the model processor is configured to operate as one or more state machines, each state machine tracking the current state of a respective model.

In an embodiment the relationship processor is configured to operate as one or more state machines, each state machine tracking the current state of respective relationships between models.

In an embodiment the system further comprises a graphics engine for causing a graphical representation of one or more of the models to be displayed.

In an embodiment the system further comprises a graphics engine for causing a graphical representation of one or more of the relationships to be displayed.

In an embodiment the model processor comprises one or more modules, each module for creating and maintaining one or more of the models based on the received measurement data.

In an embodiment the relationship processor comprises one or more modules, each module for forming and maintaining one or more of the relationships based on the models.

In an embodiment the system further comprises a notifier for notifying an actor when an alert is generated.

In an embodiment the system further comprises a message constructor for providing the actor with a message as part of the notification.

In an embodiment the message constructor is configured to construct the message from one or more of: the relationships related to a model which caused the alert, the characteristics of the models in the relationship which caused the alert, or the measurement data on which the characteristics are based that were used to form the relationship which caused the alert.

In an embodiment the system further comprises an event processor for controlling the modules and transferring event messages to and between modules.

In an embodiment the system further comprises an event logger for logging the creation of models, updating of models, the creation or updating of relationships between models or the generation of an alert.

In an embodiment the system further comprises a report manager for preparing and delivering a report on events logged by the event logger.

According to the present invention there is provided a method comprising:

receiving measurement data;

processing the measurement data to be categorised as being related to one or more models of a real-world thing, wherein the one or more related models are associated with a geographical characteristic based on the measurement data, wherein each geographic characteristic comprises an area or volume of relevance and a geographic location of the area or volume or relevance;

processing the geographical characteristics associated with the models to determine whether any of the areas or volumes of relevance intersect or are within a specified proximity;

generating an alert when there is an intersection or the volumes of relevance are determined to be within the proximity.

In an embodiment one or more of the models relate to an object having a fixed geographic location.

In an embodiment one or more of the models relate to an object having a variable geographic location.

In an embodiment one or more of the models relate to an event that may occur at a fixed geographic location.

In an embodiment one or more of the models relate to an event that may occur at a variable geographic location.

In an embodiment one or more of the models relate to a phenomenon that may occur in geographic area.

In an embodiment one or more of the models relate to an object, event or phenomenon that is transient or is movable.

In an embodiment the method further comprises processing the geographical characteristics associated with the models to determine whether they are likely to intersect and generating an alert when there is a likelihood of an intersection.

In an embodiment the method further comprises sending a notification of the alert.

In an embodiment the method further comprises applying filtering to the alert such that the alert is only maintained in predetermined conditions and sending a notification of the alert when the alert is maintained.

In an embodiment processing the measurement data occurs periodically.

In an embodiment the period between processing the measurement data is adjustable.

In an embodiment processing the geographical characteristics associated with the models to determine whether they intersect occurs periodically.

In an embodiment the period between each determination of whether there is an intersection is adjustable.

In an embodiment the one or more models are associated with other characteristics based on the measurement data.

In an embodiment the other characteristics are used to determine one or more of the following:

the period between processing the measurement data;

the period between each determination of whether there is an intersection;

the nature of the filtering applied to the alert.

In an embodiment at least one of the models is a representation of a tangible asset.

In an embodiment one of the models is a representation of an object, event or phenomenon that is a threat to a tangible asset.

In an embodiment the area or volume of relevance is determined by extrapolating an area or volume that may be relevant to the model.

According to the present invention there is provided a system comprising:

a receiver of measurement data;

a processor for processing the measurement data to be categorised as being related to one or more models of a real-world object, event or phenomenon, wherein the one or more related models are associated with a geographical characteristic based on the measurement data, wherein each geographical characteristic comprises an area or volume of relevance and a geographic location of the area or volume or relevance;

a processor for processing the geographical characteristics associated with the models to determine whether any of the areas or volumes of relevance intersect or are within a specified proximity;

a processor for generating an alert when there is an intersection or the volumes of relevance are determined to be within the proximity.

According to the present invention there is provided a system comprising:

an object creator which triggers creation of an object when input data meets object creation criteria, wherein the objects are at least two models of real-world things, at least one relationship between the models and an alert generator;

a processor module for each of the created objects, each processor module receives data, processes the data including applying criteria to the received data, and stores the processed data;

wherein the received data of the model objects are measurement data, the criteria is one or more rules that reflect that the measurement data is relevant to a characteristic of the real-world thing represented by the model and the stored data is characteristics of the model based on the measurement data;

wherein the received data of the relationship object is the model characteristics, the criteria is one or more rules that reflect that the real-world thing of one model has an influence over, relevance to or is related to the real-world thing of another model and the stored data is relationship properties based on the relevant model characteristics, wherein the received data of the alert generator object is the relationship properties, the criteria is one or more rules that reflect the relationship between the modelled real world things is significant and the stored data is an alert based on the relationship properties.

In an embodiment the system further comprises a notifier configured to notify an actor of one or more alerts when the alerts meet a notification criterion.

According to the present invention there is provided a method comprising:

triggering creation of an object when input data meets object creation criteria, wherein the objects are at least two models of real-world things, at least one relationship between the models and an alert generator;

for each of the created objects, receiving data, processing the data including applying criteria to the received data, and storing the processed data;

wherein the received data of the model objects are measurement data, the criteria is one or more rules that reflect that the measurement data is relevant to a characteristic of the real-world thing represented by the model and the stored data is characteristics of the model based on the measurement data;

wherein the received data of the relationship object is the model characteristics, the criteria is one or more rules that reflect that the real-world thing of one model has an influence over, relevance to or is related to the real-world thing of another model and the stored data is relationship properties based on the relevant model characteristics, wherein the received data of the alert generator object is the relationship properties, the criteria is one or more rules that reflect the relationship between the modelled real world things is significant and the stored data is an alert based on the relationship properties.

In an embodiment the method further comprises notifying an actor of one or more alerts when the alerts met a notification criterion.

According to the present invention there is a system comprising:

means for receiving measurement data;

means for processing the measurement data to create or update at least two models and one or more characteristics associated with each model based on the measurement data, where each of the models is a representation of a real-world thing;

means for processing the characteristics associated with the models to form one or more relationships between the models when the characteristics are such that two or more of the models are regarded as being related according to one or more relationship criteria;

means for processing the relationships to generate one or more alerts when one or more of the relationships meet one or more alert criteria.

According to the present invention there is a system comprising:

means for categorising the received measurement data as related to one or more models, wherein each of the one or more models is a representation of a real-world thing, wherein one or more of the models have one or more associated characteristics that are based on the related measurement data;

means for forming one or more relationships between the models when the characteristics are such that two or more of the models are regarded as related according to one or more relationship criteria;

means for generating one or more alerts when one or more of the relationships meet one or more alert criteria.

According to the present invention there is a system comprising: receiving measurement data;

means for processing the measurement data to be categorised as being related to one or more models of a real-world thing, wherein the one or more related models are associated with a geographical characteristic based on the measurement data, wherein each geographic characteristic comprises an area or volume of relevance and a geographic location of the area or volume or relevance;

means for processing the geographical characteristics associated with the models to determine whether any of the areas or volumes of relevance intersect or are within a specified proximity;

means for generating an alert when there is an intersection or are determined to be within the proximity.

According to the present invention there is a system comprising:

means for triggering creation of an object when input data meets object creation criteria, wherein the objects are at least two models of a real-world things, at least one relationship between the models and an alert generator;

for each of the created objects, means for receiving data, processing the data including applying criteria to the received data, and storing the processed data;

wherein the received data of the model objects are measurement data, the criteria is one or more rules that reflect that the measurement data is relevant to a characteristic of the real-world thing represented by the model and the stored data is characteristics of the model based on the measurement data;

wherein the received data of the relationship object is the model characteristics, the criteria is one or more rules that reflect that the real-world thing of one model has an influence over, relevance to or is related to the real-world thing of another model and the stored data is relationship properties based on the relevant model characteristics, wherein the received data of the alert generator object is the relationship properties, the criteria is one or more rules that reflect the relationship between the modelled real world things is significant and the stored data is an alert based on the relationship properties.

According to the present invention there is provided a computer program embodied in the form of a computer readable medium comprising instructions, which when executed control a computer to:

perform one of the methods described above.

According to the present invention there is provided a computer program embodied in the form of a computer readable medium comprising instructions, which when executed control a computer to:

operate as one of the systems described above.

DESCRIPTION OF ACCOMPANYING DRAWINGS

In order to provide a better understanding example embodiments of the present invention will now described, by way of example only, with reference to the accompanying drawings, in which.

DESCRIPTION OF EXAMPLE EMBODIMENTS

Figure 1:
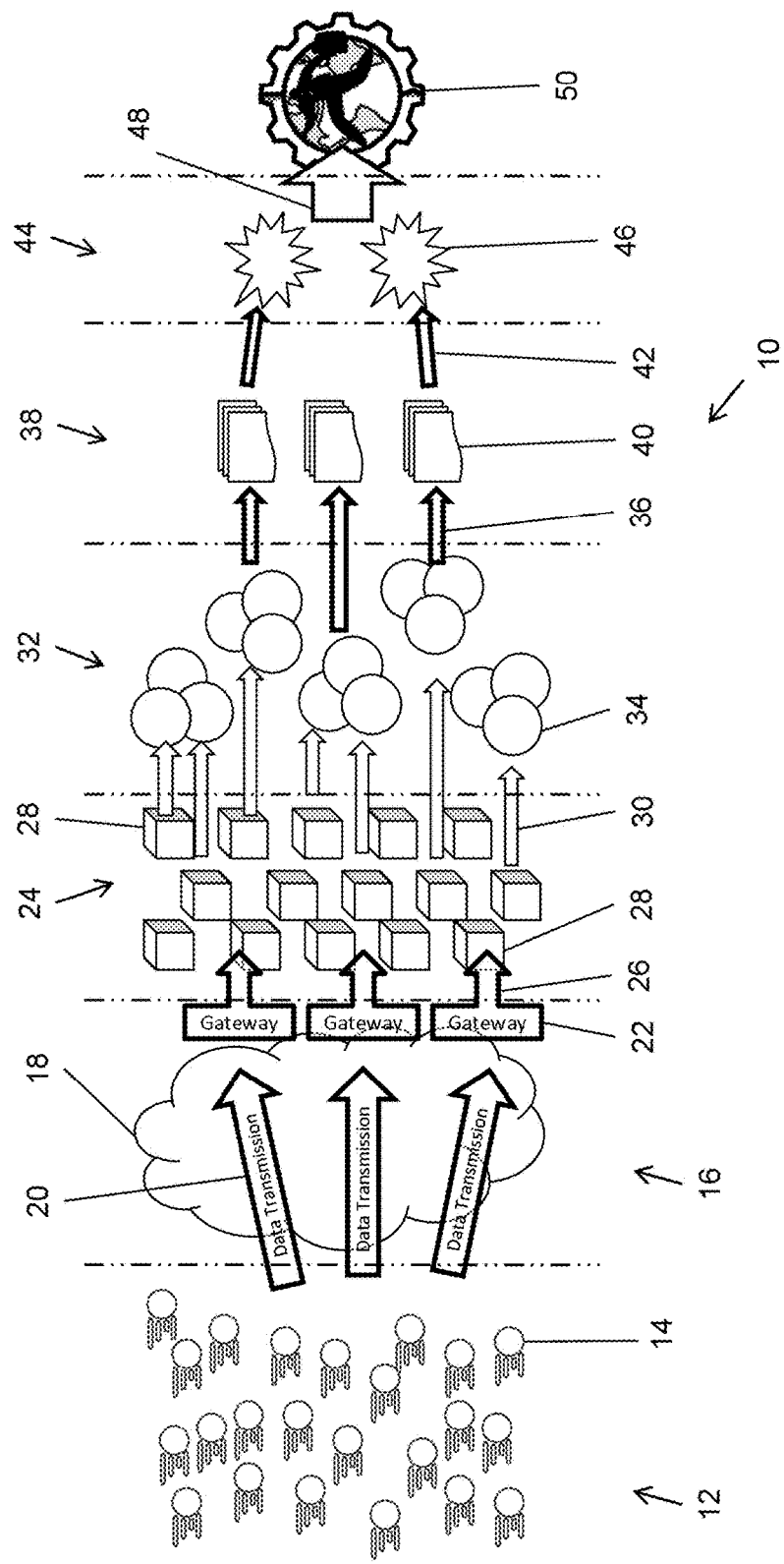
FIG. 1 is a schematic diagram of a method according to an embodiment of the invention.

Referring to FIG. 1 there is shown a processing method 10. The method 10 comprises receiving 16 measurement data items 14. Each data item 14 is generated by one or more data sources 12. The received data items 14 are processed 24 to form or update a plurality of models 28. Each model 28 represents a real-world thing or an aspect of the real-world thing. The real-world thing will typically be an object, event or phenomenon. Each model 28 has one or more characteristics which are directly or indirectly a reflection of the real-world thing based on the data items 14. The characteristics are processed 32 to produce relationships 34 between the models 28. The relationships 34 have properties based on the characteristics 30. The properties of the relationships 34 are processed 38 to generate alerts 40.

Each data item 14 may include a measurement of one or more real-world things. Each data item 14 will typically comprise a measured value, a time/date at which the measurement was taken and an identification of the source of the data item 14 so that it can be related to the respective real-world thing. The data items 14 may comprise other information as well. Typically each data item 14 will be transmitted from an instrument, sensor or another system or device that measures or records a measurable feature of the respective real-world thing. Each data item 14 may be a discreet data record, a collection of records or a data stream.

Examples of real-world things are: people, vehicles (landcraft), aircraft, power-lines, railway lines, buildings, devices, machinery, forests, bush-land, property, dams, mining or industrial processes, bush or forest fires, lightning strikes, floods, weather, storms, tsunamis, storm surges, tides, water level, volcanoes or natural disasters. This list is intended to be indicative and not exhaustive.

Examples of measurement data 14 created by an instrument are for example: a speed, direction, departure location, current location, destination or activity, a fixed asset location or geographic extent, time, date, season, temperature, predicted temperature, fire, flood or storm etc location, extent, severity, intensity, predicted path, area/volume of effect, seismometer readings, or an authority issued warning. This list is intended to be indicative and not exhaustive.

The measurement data 14 is typically transmitted over a transmission medium 18, such as a computer network that may be for example, the Internet. Alternatively, the transmission medium 18 may be a local area network, a wide area network or some other suitable transmission medium. The transmission medium 18 may comprise one or more data transmission channels 20. For example, when the data item 14 is generated by an instrument, the instrument may be connected via the Internet to a gateway 22, with the transmission path over the Internet being a particular data transmission channel 20. The measurement data 14 is received 16 and collected at one or more gateways 22. Each gateway 22 can receive pushed measurement data 12 or actively pulls or harvests the measurement data 14. Each gateway 22 will typically have one or more data transmission channels 20 associated with it, such that only those data transmission channels 20 associated with each gateway 22 will provide the respective gateway 22 with the measurement data 14. Each data transmission channel 20 will typically have one or more sources 12 of the measurement data 14 associated with it, such that only those sources 12 of the measurement data associated with the respective data transmission channel 20 will provide the data transmission channel 20 with the respective measurement data 14.

The collected measurement data 14 is provided 26 to one or more model processors (described further below). The one or more model processors form and update 24 the one or more models 28 according to the relevant measurement data 14. One or more relationship processors (described further below) obtain messages 30 comprising characteristics of the models 28 to form the relationships 34. Each relationship 34 is formed by the relationship processors analysing the characteristics from one or more models 28. One or more alert processors (described further below) obtain messages 36 comprising properties of each relationship 32 to generate 38 alerts 40 by analysis of the relationship properties. Each alert 40 generated is analysed 44 to determine whether to provide a notification 46 to an actor via a delivery system. The actor may be a system or a person. The system or person is then able to review 48 the notification 46 in order to instigate an appropriate action 50. The notification 46 may result from or notify about one or more alerts 40.

Figure 2:
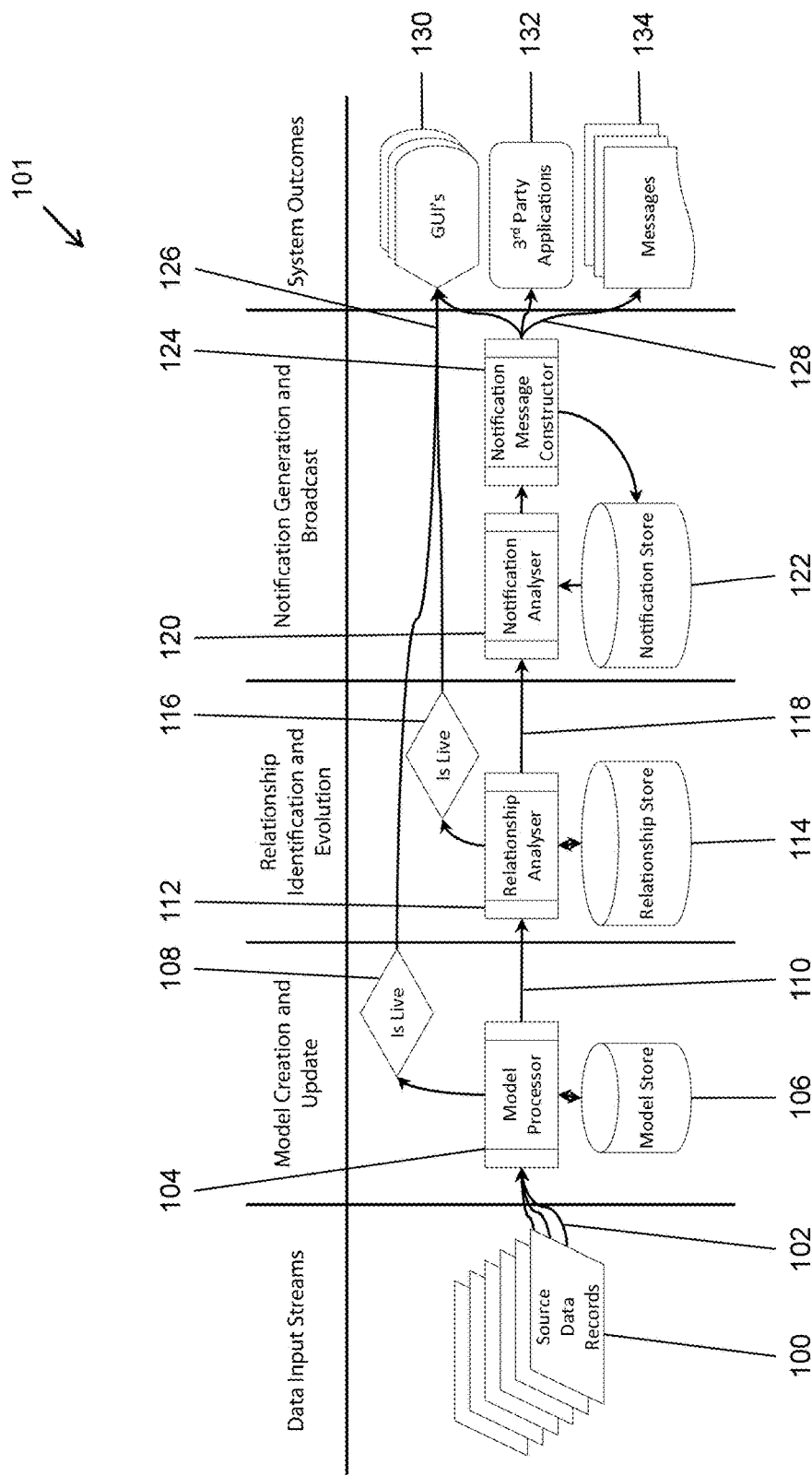
FIG. 2 is a schematic diagram of a system according to an embodiment of the invention.

Referring to FIG. 2, there is shown a processing system 101 which comprises one or more measured data sources 100, which collectively produce the measurement data 14 (of FIG. 1). The data sources 100 are connected 102 to a model processor 104. The model processor 104 creates the models 24. The model processor 104 may provide a processing module for each model 24. Model processor 104 stores the models 24 and characteristics of models 24 in a model store 106. The model processor 104 has a checking element 108 for checking whether a newly created model or a model update needs to be presented in a live environment, such as a web site. Those models or model characteristics that are to be included in the live environment are collected by collector 126.

The models 26 and characteristics of the models are provided by message over connection 110 to relationship processor 112. Alternatively model processor 104 sends a signal that there is a change in the models 24, that is, a new model has been created or an update to a model has occurred. Relationship processor 112 analyses the models 24 and their characteristics to determine whether a relationship exists between the models which is a reflection of a relationship between the real-life things. When a relationship is found to exist, a representation 34 of the relationship between the models and its properties is stored in a relationship store 114. The relationship processor 112 has a checking element 116 that checks whether any changes to the relationship properties should be presented in the live environment. Those relationships that are to be presented in the live environment are collected by collector 126.

The generated relationships 34 are sent by message 118 to an alert processor 120 which analyses the relationships 34 and creates alerts 40 based on the relationship properties. The alert 40 may trigger generation of a notification 46 to the actor by the notification message constructor 124. The notification 46 is stored in a notification store 122. The notification 46 is sent over a transmission medium 128 to one or more notifiers which inform the actor. In one embodiment the notifier is the live environment in the form of a Graphical User Interface (GUI) 130, which may be in the form of the web browser. In another embodiment the notifier is a third party application 132. In another embodiment the notifier is a message system 134 which sends a message, such as by e-mail or text message to a portable device.

More complex implementations of the method and system may provide feedback from model to model, relationship to relationship, relationship to model, alert to model or alert to relationship.

Figure 3:
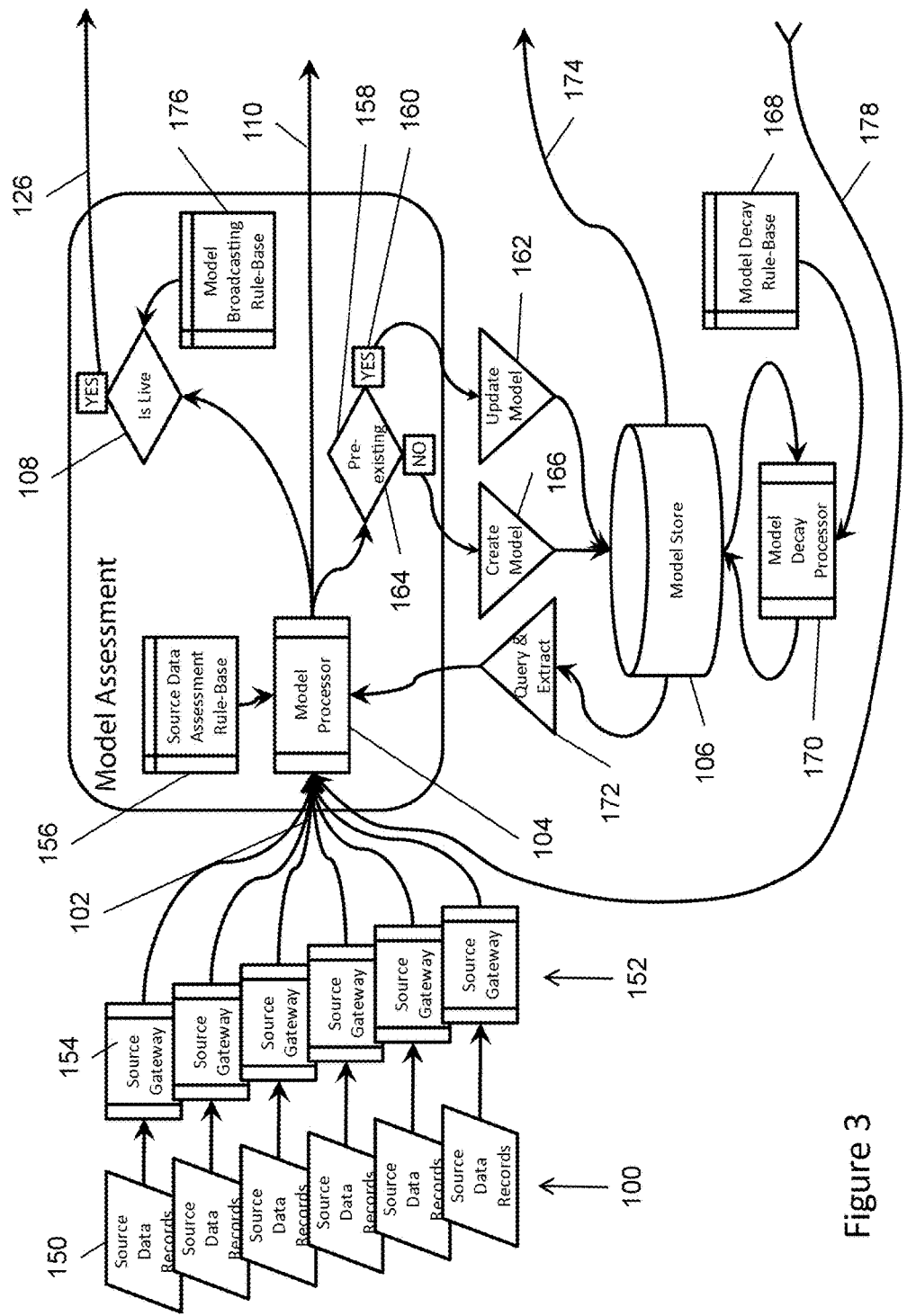
FIG. 3 is a schematic diagram of a first portion of a system according to another embodiment of the invention.
Figure 4:
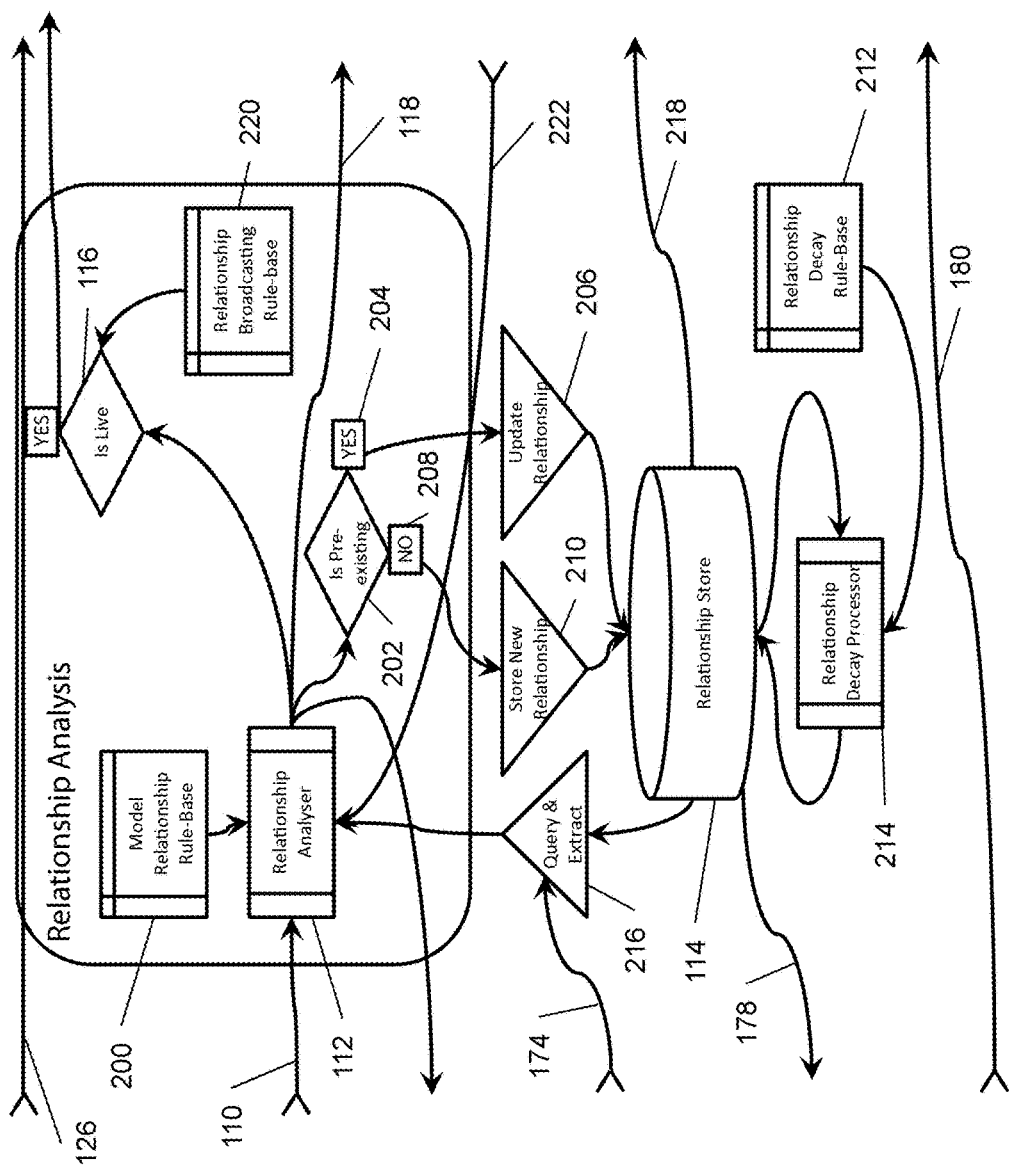
FIG. 4 is a schematic diagram of a second portion of the system according to embodiment of FIG. 3.
Figure 5:
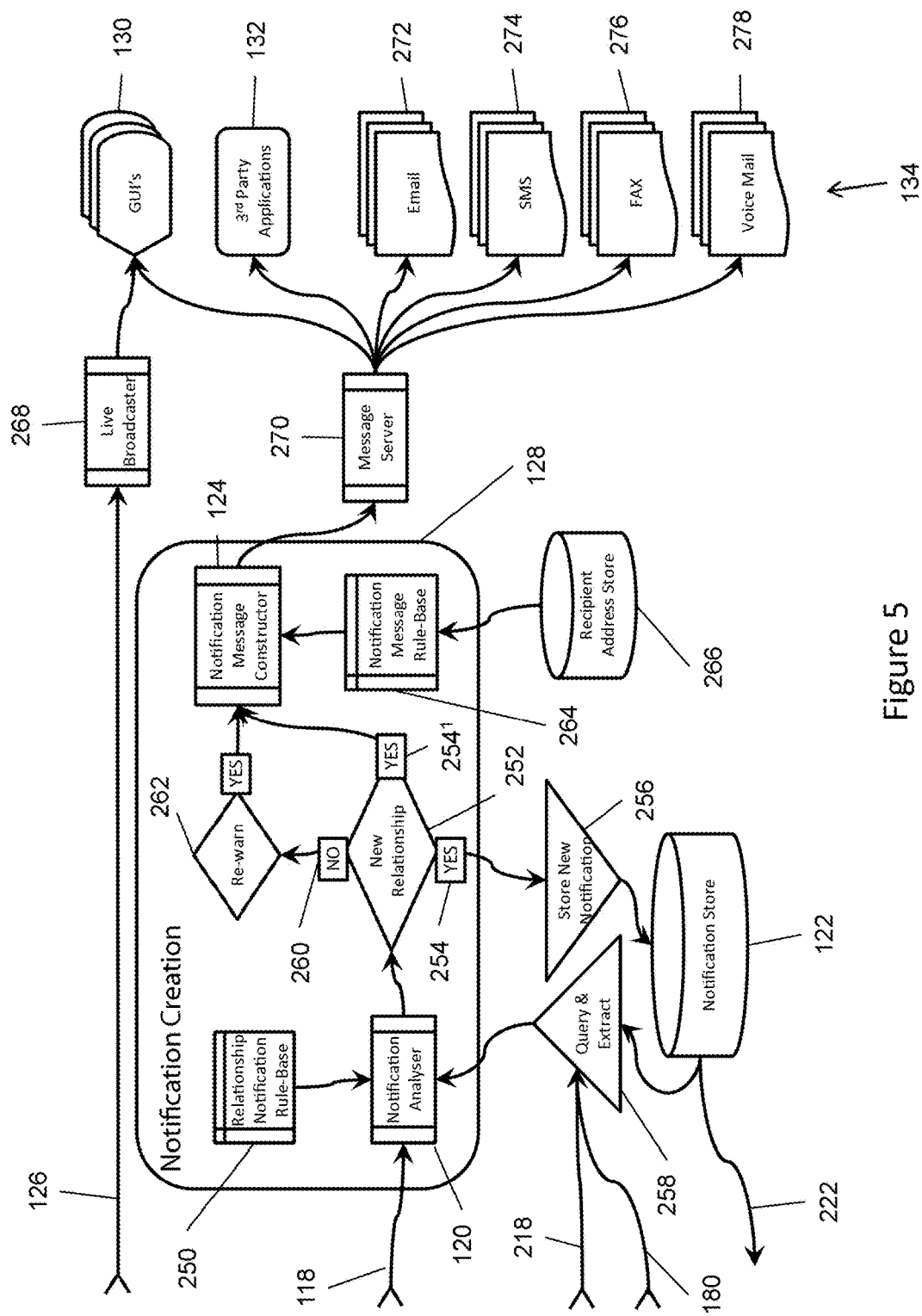
FIG. 5 is a schematic diagram of the third portion of the system according embodiment of FIG. 3.

Referring to FIGS. 3-5, a more detailed embodiment of the system 101 of FIG. 2 is described. The measurement data 14 is typically in the form of data records or a data stream when produced by the data sources 100. Each data source 150 may have a respective source gateway 154. The source gateways 154 may be implemented as a pre-processor 152. The pre-processor 152 performs pre-processing which may comprise receiving the data records/data stream and formatting the data into a standard form. In an event driven embodiment the generation of a standardised data record will raise a data arrived event flag. Alternatively a data arrived event message is sent to the model processor 104.

Each standardised data record is provided over connection 102 to the model processor 104. Alternatively when the data arrives an event flag is raised, or the data arrived event message is received, the model processor 104 will fetch the standardised data record from a buffer or queue. Model processor 104 accesses a source data assessment rule-base 156 to determine whether the data has relevant information to a model. When the data is relevant to a model a checking element 158 of the model processor 104 determines whether the model that the data is relevant to already exists. When the model does not exist 164 a model 28 of a certain type is created by model creation element 166 of the model processor 104. Each model may have the following characteristics, for example: an identification, a model type, a current state, criteria for changing the state, a methodology for creation and termination, other information—such as a geographic location. The characteristics are stored in the model store 106 for access by the model processor 104 and the relationship processor 112. The model processor 104 can operate a state machine to track the current state of the model according to the criteria for changing the state. The state machine may simply transition or track states with a trivial implementation, or the state machine may be implemented as a state machine processor, depending on the requirements of the application. The current state is usually one of the characteristics of the model.

When the model 28 already exists 160 characteristics of the model 28 are updated. For example the data may trigger the state machine to change the state of the model according to a rule of the criteria for changing the state. The creation or update to the model 28 is recorded in the model store 106.

In some embodiments the model processor 104 accesses a model decay rule-base 168, which determines the way in which a model (or usually the state of the model) is subjected to decay over time so that the model (or its current state) becomes less relevant with time unless it is updated by the arrival of new data.

The model processor 104 may query and extract information from the model store 106 using query element 172. Some models may be created based on the characteristics of other models. The model processor 104 may query and access via connection 178 the relationship store 114. The model processor 104 may use this information when applying the rule-base 156 to decide whether data is relevant to a model. In this case the model that is created may be composite or it may be a representation of a virtual thing rather that a real-world thing. Such models may be only partly directly based or may be indirectly based on the measurement data.

Model broadcasting rule base 176 is used by checking element 108 to decide whether a model (or characteristics thereof) is provided to the life environment.

In an event driven embodiment the creation or updating of a model will raise a models changed event flag. Alternatively a models changed event message is sent to the relationship processor 112.

Each created model or updated model is provided over connection 110 to the relationship processor 112. Alternatively when the models changed event flag is raised or the models changed event message is received, the relationship processor 112 will fetch the characteristics of the created/updated model from the model store 106 via connection 174. Relationship processor 112 accesses a model relationship rule-base 200 to determine whether two or more models have a relationship. When a relationship is determined to exist a checking element 202 of the relationship processor 112 determines whether a record of the relationship already exists. When a record of the relationship does not exist 208, a record of properties of the relationship 34 of a certain type is created by relationship record creation element 210 of the relationship processor 112. Each relationship record may for example have the following properties: an identification, a relationship type, a current state, criteria for changing the state, a methodology for creation and termination, references to the model in the relationship, other information. The relationship processor 112 will typically operate a state machine to track the current state of the relationship according to the criteria for changing the state. The current state is typically one of the relationship properties stored in the relationship store 114.

When the relationship record 34 already exists 204, properties of the relationship 34 are updated. For example, a change in a model may trigger the state machine to change the state of the relationship that the model has with another model according to a rule of the criteria for changing the state. The creation or update to the relationship 34 is recorded in the relationship store 114.

In some embodiments the relationship processor 112 accesses a relationship decay rule base 212, which determines the way in which a relationship (or usually the state of the relationship) is subjected to decay over time so that the relationship (or its current state) becomes less relevant with time, unless it is updated by a new model or change in a model causes a change in the relationship.

The relationship processor 112 may query and extract information from the relationship store 114 or the model store 106 via connection 174 using query element 216. The relationship processor 112 may query and access via connection 222 the notification store 122. The relationship processor 112 may use this information when applying the rule-base 200 to decide whether models have a relationship. In this case the relationship that is created may be composite. Such models may be only partly directly based or indirectly based on the measurement data.

Relationship broadcasting rule base 220 is used to decide whether a relationship (or property thereof) is provided to the life environment by checking element 116.

In an event driven embodiment the creation or updating of a relationship will raise a relationships changed event flag. Alternatively a relationships changed event message is sent to the alert processor 120.

Each created relationship or updated relationship 34 is provided over connection 118 to the alert processor 120. Alternatively when the relationships changed event flag is raised, or the relationships changed event message is received, the alert processor 120 will fetch the properties of the created/updated relationship from the relationship store 114 via connection 218. Alert processor 120 accesses a relationship notification rule-base 250 to determine whether the relationship should generate an alert 40 and/or a notification 46. In some embodiments the alert processor sends the alert as the notification. In other embodiments a notification processor decides when and how to send a notification based on the alerts.

When a relationship is determined to exist a checking element 252 of the alert processor 120 determines whether to generate a notification 46, such as whenever a new relationship is formed. When the relationship is new 254 a recording of the notification 46 of a certain type is created by relationship record creation element 256 of the alert processor 118. Also when the notification is to be send 254' this causes a notification message constructor 124 to create a notification 46. Each notification 46 may have the following information for example: an identification, a notification type, reason for generation of the notification, such as the models in the relationship that cause the notification and the type and/or current state of the relationship, other information.

When the notification 46 is not new 260, a re-issue element 262 determines if another notification 46 should be sent, for example the re-issue element may operate a re-warn period during which another notification is not send until the period expires.

The creation or update to the alert and notification 46 is recorded in the notification store 122.

The alert processor 118 may query and extract information from the relationship store 114 via connection 218 using query element 258. The alert processor 118 may query and extract information from the model store 106 via connection 180 using query element 258.

A recipient address store 266 is used by the constructor 124 in conjunction with a notification message rule-base 264 to generate notification messages. The constructor 124 may use information from the model store 106 or the relationship store 114 to construct the notification content. The notification is sent via connection 128 to a message broadcaster and transmission medium 270. The live information with collector 126 is sent to a live object broadcaster 268 which may generate or simply forward instructions for a graphical display of the information. The broadcaster 268 in turn presents the information to the graphical user interface 130 of a browser. The message medium 134 may be for example e-mail 272, short message service (SMS) 274, fax service 276 or voice mail service 278.

The processing system 101 is typically implemented in the form of one or more computers or CPUs controlled by one or more computer programs, which comprise instructions, which when executed, control one or more processors of the computers to operate as the processing system 101 and/or to perform the method 10. The computer program will typically be stored in non-volatile storage and loaded into working memory. The non-volatile storage may be a hard disk drive, CD and DVD, flash drive etc. Working memory may be for example, random access memory (RAM). Alternatively the processors described above may be discrete physical or logical processing units.

The processors 104, 112, 120, 129 may be in the form of virtual processes running on the system or discrete processing units allocated to the particular task. The information stored in the model store 106, relationship store 114, notification store 122 and the various rule-bases 156, 176, 168, 200, 220, 212, 250, 264 & 266 may be implemented as one or more volatile or non volatile storage devices.

The system 101 can be implemented in a modular manner. For example, the system may comprise an object creator which triggers creation of an object when input data meets one or more object creation criteria, wherein the objects created are at least two models representative of real-world things, at least one relationship between the models and an alert object. A processor module may by used for each of the created objects. Each processor module is configured to receive data, process the data including applying criteria to the received data, and store the processed data.

For the model objects, the received data are the measurement data items 14, the criteria is one or more rules that reflect that the measurement data is relevant to a characteristic of the real-world thing represented by the model and the stored data is one or more characteristics of the model based on the measurement data.

For relationship objects, the received data are the model characteristics, the criteria is one or more rules that reflect that the real-world thing of one model has an influence over, relevance to or is related to the real-world thing represented by another model and the stored data is relationship properties based on the relevant model characteristics.

For alert objects, the received data are the relationship properties, the criteria is one or more rules that reflect the relationship between the modelled real world things is significant and the stored data is an alert based on the relationship properties.

Figure 6:
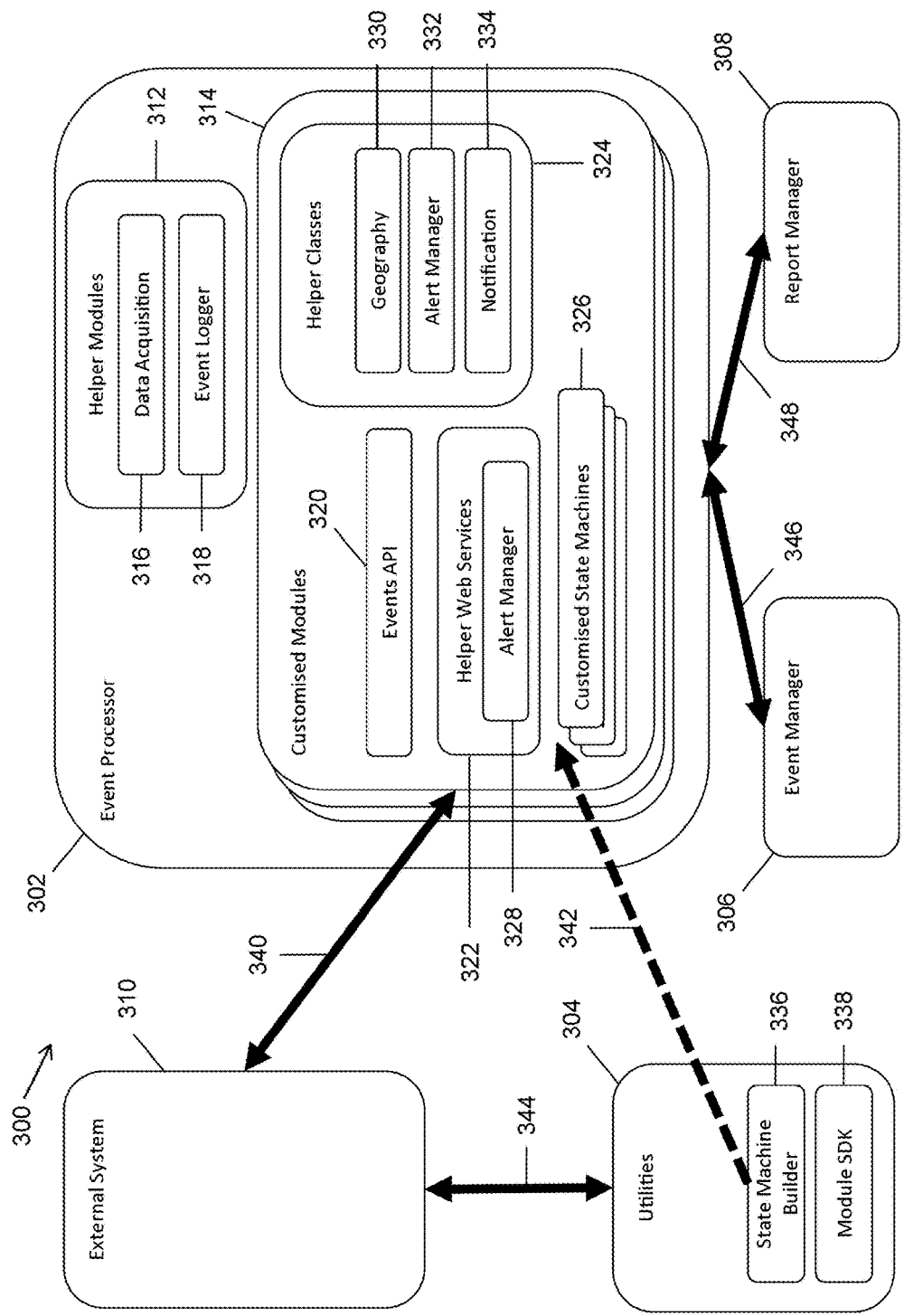
FIG. 6 is a schematic block diagram of a system architecture, according to an embodiment of the invention.

Referring to FIG. 6 an embodiment of an event driven architecture 300 for implementing the processing system 101 is shown. The architecture comprises an event processor 302, an event manager 306 and a report manager 308. The architecture 300 also has utilities 304 and an external system 310.

The architecture 300 is typically implemented in an event driven manner by using the event processor 302 to perform operations when an event occurs and by using the event manager 306 to route events. The event processor 302 is arranged to implement modules to perform various operations including the operations of the model processor, relationship processor and the alert generating processor. The event manager 306 passes event messages to the relevant module in the event processor 302.

In an embodiment the architecture 300 implements the event processor 302, event manager 306 and report manager 308 engine along with the utilities 304. The architecture 300 requires the processor modules, which may be in the form of plug-ins into the engine, to be developed according to the needs of the application to which the system 101 is being deployed. The deployment may also involve the one or more external systems 310. Some of the processor modules are custom built to provide a specific implementation for the deployment, according to the real-time things being monitored and the respective rules for generation of models, relationships, alerts and notifications. That is some of the processor modules perform as a model processor, a relationship processor and an alert generating processor.

Utilities 304 are used to construct the customised modules. The utilities 304 may comprise a state machine builder 336 and possibly a processor module Software Development Kit 338. The external system 310 may include the data sources, transmission media 340 to and from the event processor 302, and the live environment 130 and message medium 134.

Each customised processor module may be implemented as a plug-in. The plug-ins are developed as a separate class library which can be inserted into a module repository of the event processor 302. The event processor 302 will instantiate the plug-ins as necessary. Data contracts may be established between modules and the event manager 306 so that the event manager 306 is notified of an event. For example a module that produces X will broadcast that it can make X available and another module that needs X will let the first module know to send it X. Further an event plug-in section of the event processor 302 is used so that the event processor knows which plug-ins to load.

The state machine builder 336 assists in generation of a custom state class, a custom state machine class, tables and stored procedures needed to store the state machine's current state and state history. To generate the state machine class the user enters the possible states of the state machine, and custom fields needed to run the state machine. Database tables are then created. The state machine also assists by recording definitions of the rules for transitions in the state machine model.

Event processor 302 comprises helper modules 312. Event processor 302 also accepts and hosts the custom built modules 314 and handles delivery of events to the modules 314. Events generated by the modules 312 or 314 are provided to the event manager 306, which routes events back to the appropriate one of the other modules 312 or 314.

The helper modules 312 comprise one or more data acquisition modules 316 and an event logger 318. The data acquisition module 316 may be configured to operate as source gateways 154, or may be configured to operate as a precursor to the source gateways 154 by buffering input from the data sources 100. In one embodiment the event logger 318 listens for and records events in a database.

Customised modules 314 comprise an events API module 320, a helper Web services module 322, customised state machines 326 and helper classes 324. The modules are a class implemented for the particular application, and can directly access classes of the helper module 312. Events API module 320 provides functions that can be used with the other customised modules 314 to raise or capture events. The helper classes 324 are classes that can be used by the custom modules 314 and are also available to the external systems 310. Helper classes 324 comprise a geography module 330, which is a generic geo-relational spatial feature management class; an alert manager class 332, which provides generic alert condition evaluation and event raising; and a notification class 334, which provides generic methods of delivering messages externally. The alert manager class 332 can operate as the alert processor 120 and the notification class can operate as the notification message constructor 124.

The helper web services module 322 comprises an alert manager 328 which is a template for configuring evaluation of alert conditions for modules implementing the alert manager helper class 332. The customised state machine 326 is for example a class implemented for the solution based on a state machine class. Template state machine classes and associated database containers are created using the state machine builder 336 at a time of devising the deployment implementation.

The report manager 308 provides methods of configuring and delivering reports. The state machine builder 336 is a tool for creation of classes and database structure of the customised state machines 326. The module SDK 338 assists in developing the events API module 320 and other customised modules 314 according to the deployment implementation desired.

The external system 310 accesses the utilities 304 by link 344 to defined state machines 326 and other modules 314.

When the architecture is deployed the state machines and customised modules are "plugged into" the event processor 302 at 342.

Event manager 306 receives event messages by communication 346 generated in the event processor 302 and routes these event messages to the appropriate destination module by communication 346. The report manager 308 generates reports as desired from the event messages generated in the event processor 302 and returns them over communication 348.

Figure 7:
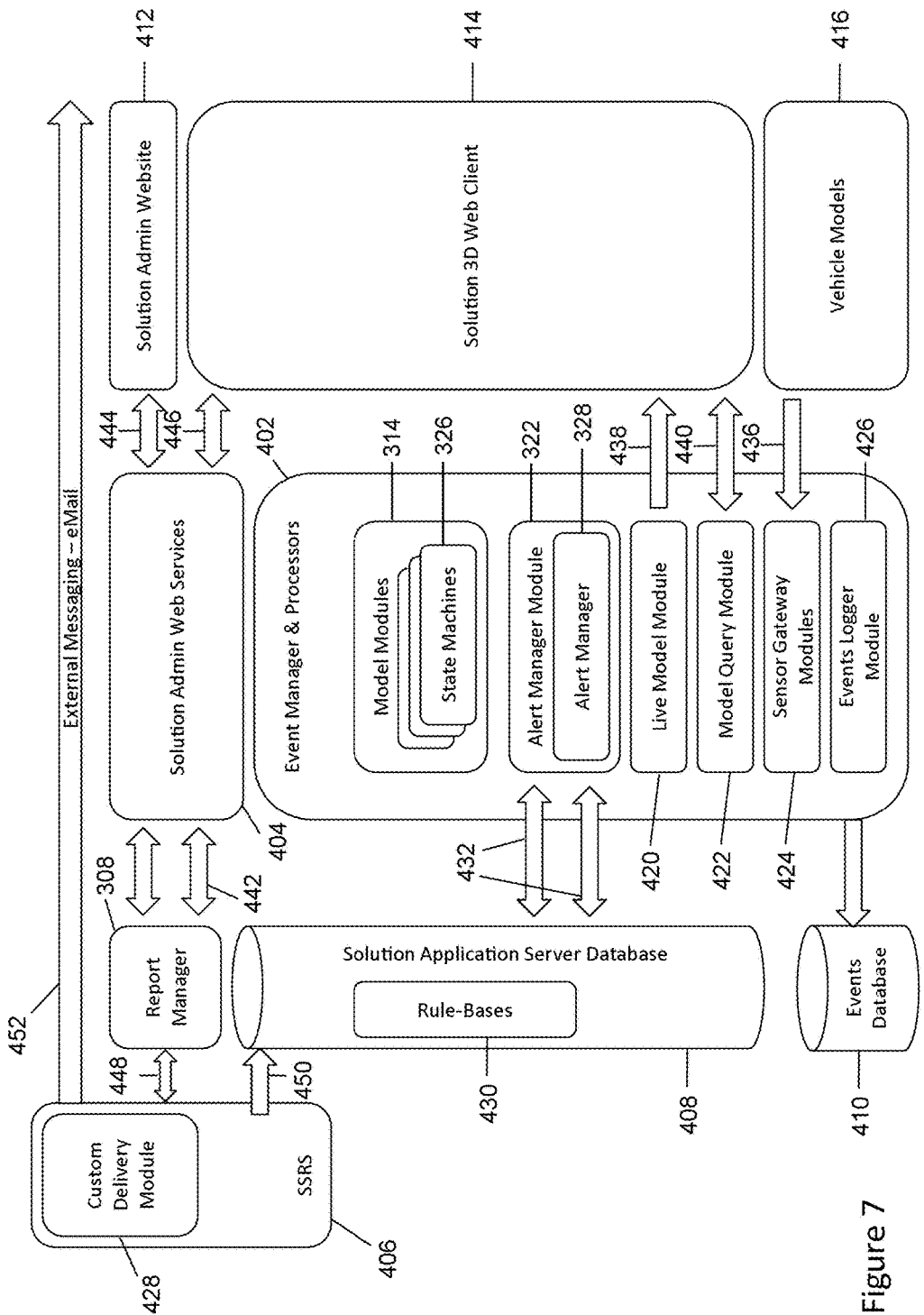
FIG. 7 is a schematic block diagram of a solution architecture according to an embodiment of invention.

Referring to FIG. 7, the architecture of FIG. 6 is used in an example application 400 for monitoring a construction site. In this application it is desired to monitor a construction site to determine the location and activities of vehicles within the construction site. The solution architecture 400 comprises the engine 402 of FIG. 6 (including the event processor 302 and event manager 306), the report manager 308 of FIG. 6, an Admin Web services component 404, a SQL Server 406, a solution application server database 408, an events database 410 for the engine 402 to store events in, a solution Admin website 412, a solution 3D Web client 414, and a models definition 416 (rules by which vehicle models are generated updated and maintained).

Within the engine 402 some of the customised modules 314 are implemented as model modules which create and update models of the vehicles in the construction site according to the definitions 416. The model modules will establish a one or more state machines 326 for tracking the state of each vehicle being modelled. The model modules may be regarded as operating as the model processor 104 described above, with one of the characteristics of each model being its current state, which is maintained by the respective state machine 326.

A sensor gateway module 424 is created to model a gate to the construction site. Further one of the customised modules 314 may model a relationship each of the vehicle models has with the gate model as described further below. Such a module may be regarded as operating as the relationship processor 112 as described above.

The alert manager 328 of the alert manager service module 322 may be configured to create an alert when a certain type of relationship is created between a vehicle (model) and the gate (model). In other words, the alert may be triggered when the relationship is in a certain state. This may indicate that the vehicle has passed through the gate. When the alert is created by the alert manager 328, a notification that the vehicle has passed through the gateway may be sent. The alerts are stored in the database 408 by communication 432. The database also contains rule-bases 430 related to generation and updating of models, relationships, alerts and notifications.

The alerts created by creation of the module, changes in status of a model, creation of the relationship, changes to a relationship and generation of the alert are stored events database 410 by the events logger module 426.

When one of the models or relationships is desired to be fed into the live environment, the live environment module 420 provides a communication 438 of information to the solution 3D Web client 414. A person may wish to make a query on current state of a model. The query is received and acted on by model query module 422, which provides a response to the solution 3D Web client 414.

The SQL Server 406 can access the database 408 by communication 450. The SQL Server 406 comprises a custom delivery module 428 which can communicate 448 with the report manager 308 for producing customised reports by email message 452 to an external destination. The report manager 308 communicates 442 with a solution Admin Web services module 404 to configure the report manager 308. The Web services module 404 is accessed by a solution Admin website 412. The solution Admin Web services module 404 also communicates 446 with the solution 3D Web client module 414.

Figure 8:
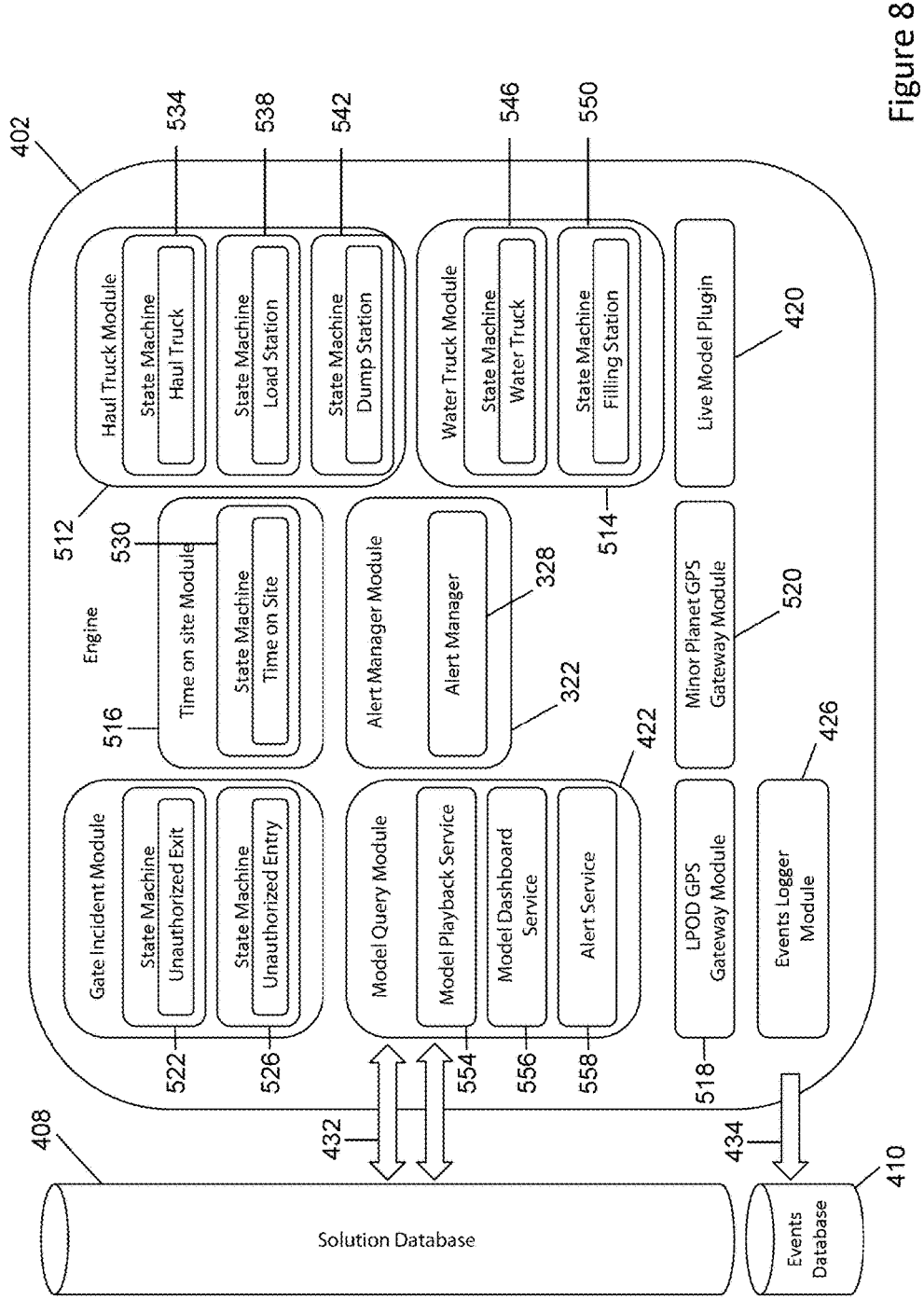
FIG. 8 is a schematic block diagram showing an engine portion of the solution architecture of FIG. 7.

FIG. 8 shows the modules within the construction site monitoring implementation of the engine 402 in more detail. The modules comprise gate incident module 510, a Haul Truck module 512, a Water Truck module 514, time on site module 516, proprietary GPS and telemetry modules 518 and 520 (one for a LPOD GPS and one for a Minor Planet GPS). Other modules comprise the live environment module 420, the model query module 422, the alert manager module 322 and the event logger module 426, which have been described above.

Gate incident module 510 comprises a state machine 522, which tracks whether or not an authorised exit of the gate occurred, and another state machine 526, which tracks whether there is an authorised entry through the gate. The gate incident module 510 follows the relationships between the vehicle models and the gate model. If a vehicle goes from one side of a gate to another (as determined by a GPS data stream from the respective vehicle) the vehicle is regarded as passing through the gate. A rule-base may specify that if the vehicle passes through the gate at a certain time it is unauthorised. During other times the vehicle may be authorised to pass through the gate. The state of the relationship in the respective state machine is updated accordingly.

The haul truck module 512 comprises a state machine 534 for the haul truck, a state machine 538 for a load station and a state machine 542 for a dump station. The haul truck module 512 follows the relationships between a haul truck vehicle model and its position relative to a load site and a dump site (as determined by a GPS data stream from the haul truck) and the time at the respective location. A rule-base may specify that if the vehicle is stationary at the load site for a certain amount of time it is loading and when it then moves again it is loaded. The rule-base may also specify that if the vehicle is stationary at the dump site for a certain amount of time it is unloading and when it then moves again it is unloaded. The state of the relationship in the respective state machine is updated accordingly.

The water truck module 514 comprises a state machine 546 for a water truck and a state machine 550 tracking a state of a filling station. The water truck module 512 follows the relationships between a water truck vehicle model and its position relative to a water filling station (as determined by a GPS data stream from the water truck) and the time at the water filling station. A rule-base may specify that if the vehicle is stationary at the water filling station for a certain amount of time it is filling with water and when it then moves again it has finished filling. The state of the relationship in the respective state machine is updated accordingly.

A time on-site module 516 comprises a state machine 530 which tracks time on site of every vehicle as a relationship between the site area and the vehicles. If there is a change in the relationship an event is generated, which will cause an alert, which will in turn generate a notification which may be sent to the database 408. A report on time spent on-site for each vehicle can be generated by report manager 308.

The model module 422 comprises a model playback service 554, a model dashboard service 556 and an alert service 558. The model module 422 can access the database 408. The model playback service 554 allows the recorded changes to the models to be played back to a user. The dashboard service allows the recorded measurement data to be played back in a dashboard display to a user.

Figure 9:
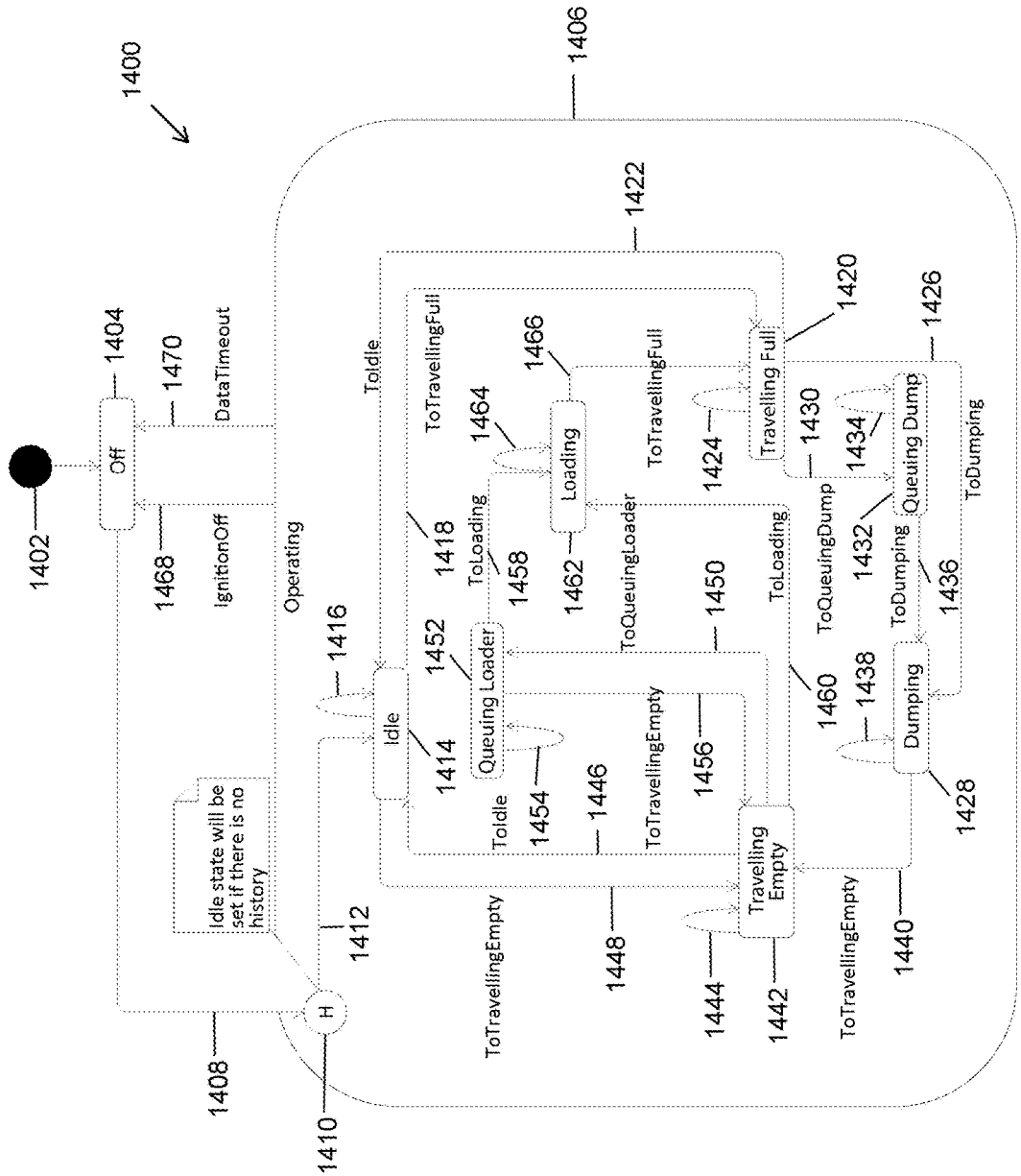
FIG. 9 is a state diagram example used in the architecture of FIG. 7.

FIG. 9 shows a state diagram 1400 implemented by a haul truck state machine. The state machine has the following states: off 1404, idle 1416, travelling full 1420, queuing dump 1432, dumping 1428, travelling empty 1442, queuing loader 1452, and loading 1462. All states except the off state 1404 are regarded as operating states 1406. The state machine starts at 1402 and transitions to the off state 1404. When the haul truck ignition is turned on, it transitions 1408 to a temporary history state 1410. The history state will reinstate any prior state that the haul truck was at before the ignition was turned off. If there is no history, then it transitions 1412 to the idle state 1414. From the idle state 1414 if the truck remains idle, the state transitions 1416 back to the idle state 1414. If the truck commences moving and it is full, it transitions 1418 to the travelling full state 1420. While the truck remains full and is travelling, it transitions 1424 back to the travelling full state 1420. The truck remains stationary in the proximity to the dumping station it transitions 1430 to the queuing state 1432. When it remains in the queue it transitions 1434 back to the queuing state 1432. When the truck reaches the dumping station, it transitions 1436 to the dumping state 1428. Alternatively, if the truck arrives at the dumping station without queuing it transitions 1426 from the travelling full state 1420 to the dumping state 1428. While the truck is dumping, it transitions 1438 back to the dumping state 1428. When the truck moves away from the dumping site, it transitions 1440 to the travelling empty state 1442. While the truck continues to move, it transitions 1444 back to the travelling empty state 1442. If the truck stops, it transitions 1446 to the idle state 1414. If the truck recommences movement and is empty, it transitions 1448 to the travelling empty state 1442. If the truck is in the proximity of the loading station, but does not arrive at loading station, it transitions 1450 to the queuing loader state 1452. While the truck remains there, it transitions 1454 back to the queuing loader state 1452. When the truck arrives at the loading station, it transitions 1458 to the loading state 1462. Alternatively, if the truck, having travelled empty, simply arrives at the loading station it transitions 1460 to the loading state 1462. While the truck remains at the loading station it transitions 1464 to loading state 1462. When the truck commences movement away from the loading station, the state transitions 1466 to the travelling full state 1420. At any stage, if the ignition is turned off, the state transitions 1468 to the off state 1404. Furthermore, if any stage update data is not received within a certain time, the state transitions 1470 to the off state 1404.

Figure 10:
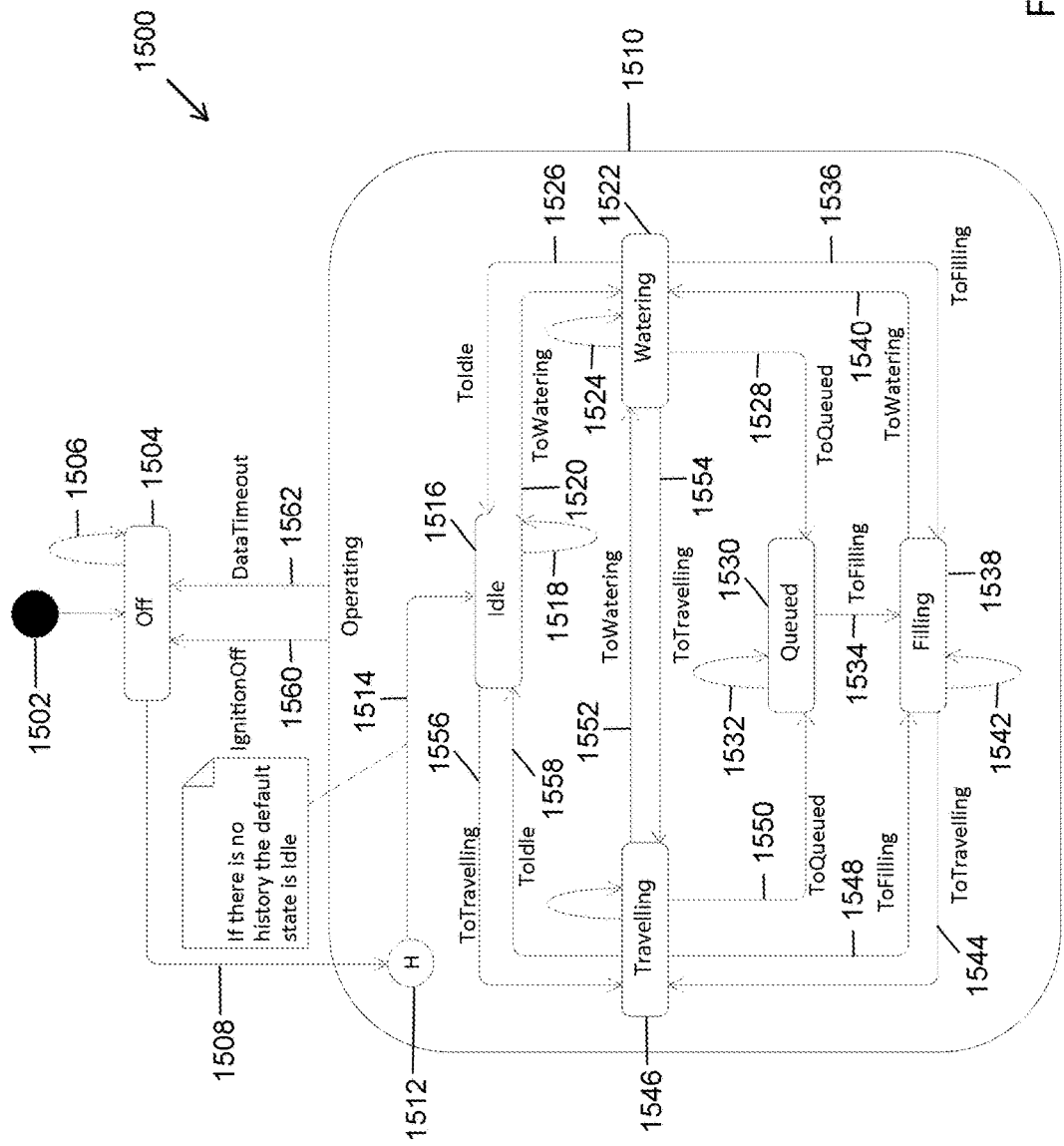
FIG. 10 is another state diagram example used in the architecture of FIG. 7.

FIG. 10 shows a state diagram 1500 implemented by a water truck state machine. The state machine has the following states: off 1504, idle 1516, watering 1522, queue 1530, filling 1538, and travelling 1546. All of the states except the off state 1104 are regarded as operating states 1510. The state machine starts at 1502 and transitions to the off state 1504. When the truck ignition is turned on, the state transitions 1508 to an interim history state 1512. The state then returns to its previous state before it was turned off, or if there was no previous state, it transitions 1514 to the idle state 1516. While the truck remains stationary it transitions 1518 back to the idle state 1516. From the idle state 1516, when the truck has water and is releasing water, it transitions 1520 to the watering state 1522. While the truck remains watering, it transitions 1524 back to the watering state 1522. When the truck is in the proximity of the watering station, but not at the watering station and is stationary, it transitions 1528 to the queued state 1530. While it remains there it transitions 1532 to the queued state 1530. When it reaches the filling station it transitions 1534 to the filling state 1530. From watering 1522 if the truck arrives at the filling station it transitions 1536 to the filling state 1538. While the truck remains at the filling station, it transitions 1542 back to the filling state 1538. If the truck leaves the filling station and commences watering it transitions 1540 to the watering state 1522. When the truck leaves the filling station, and does not commence watering, it transitions 1544 to the travelling state 1546. If it keeps travelling without watering, the state transitions back to the travelling state 1546. If from travelling 1546 the truck enters the proximity of the filling station without actually being filled, it transitions 1550 to the queued state 1530. If the truck, having been travelling 1546, commences watering it transitions 1552 to the watering state 1544. If the truck, having been watering 1422, continues travelling without watering, it transitions 1554 to the travelling state 1546. If having been travelling 1546, the truck stops movement, it transitions 1558 to the idle state 1516. If having been idle, the truck begins travelling without watering, it transitions 1556 to the travelling state 1546. If at any time the ignition is turned off, the state transitions 1560 to the off state 1504. If at any time new data does not arrive within a specified time period, the state transitions 1562 to the off state 1504.

Figure 11:
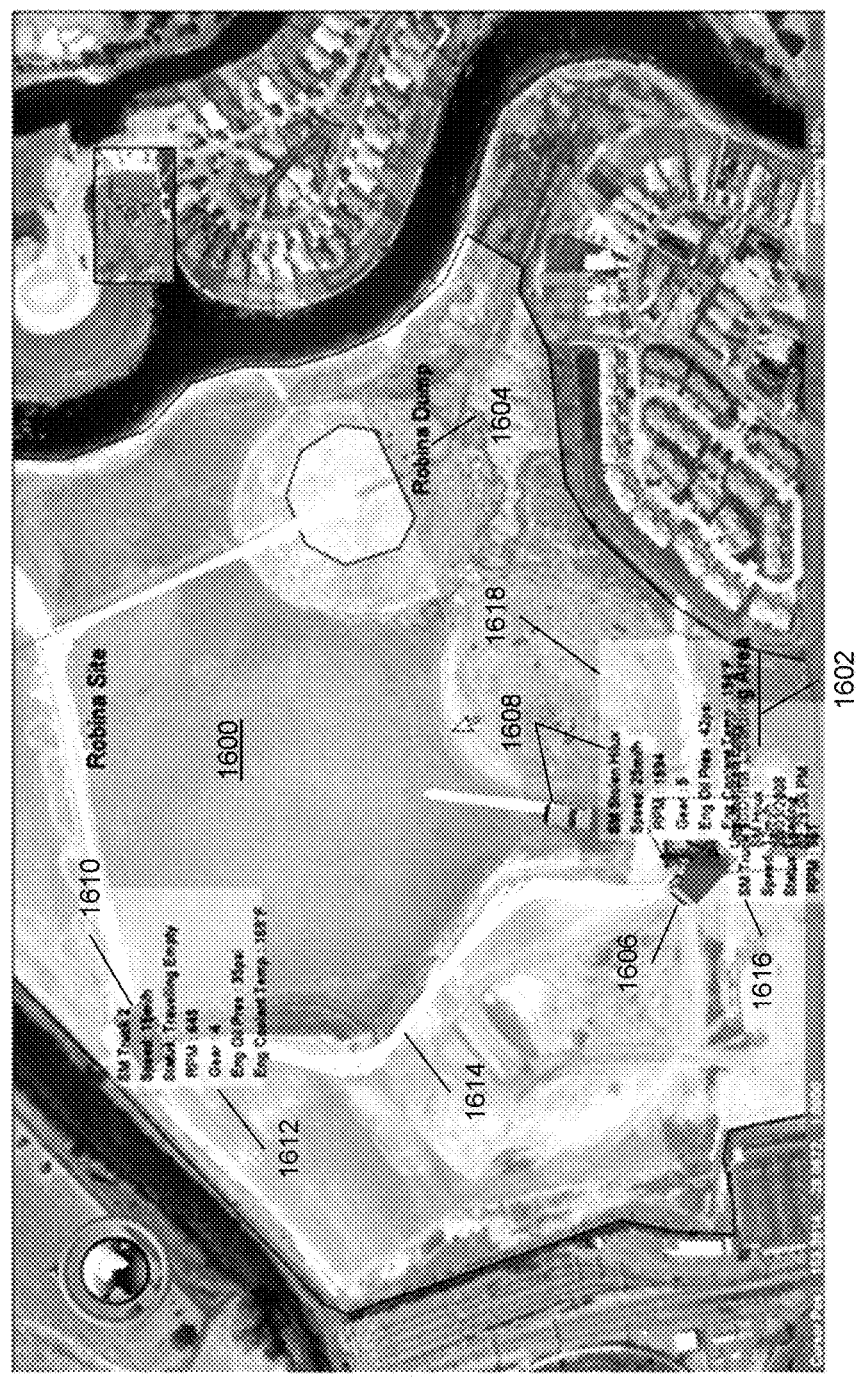
FIG. 11 is an example screenshot of a graphical user interface produced using architecture of FIG. 7.

FIG. 11 shows a screen shot of a graphical user interface (GUI) 1600 of a live reporting environment in which a construction site is depicted. The GUI 1600 shows a loading area 1602, a dump site 1604 and a roadway 1614. Also shown is a first truck 1602 and a details overlay box 1616 which displays information about the first truck 1606 including its status. The status of the first truck 1602 is Travelling Empty. A second truck 1610 is shown along with a details overlay box 1612 which displays information about the second truck 1610 including its status. The status of the second truck 1610 is Loading. Further, a third vehicle 1608 is shown along with a details overlay box 1618 which displays information about the third vehicle 1608 including its status. In this case the third truck 1608 has exited the construction site unauthorised. The status of the third truck 1608 is shown as Stolen. The positions of the trucks 1606, 1608 and 1610 can be updated as new measurement data of their locations arrives.

Figure 12:
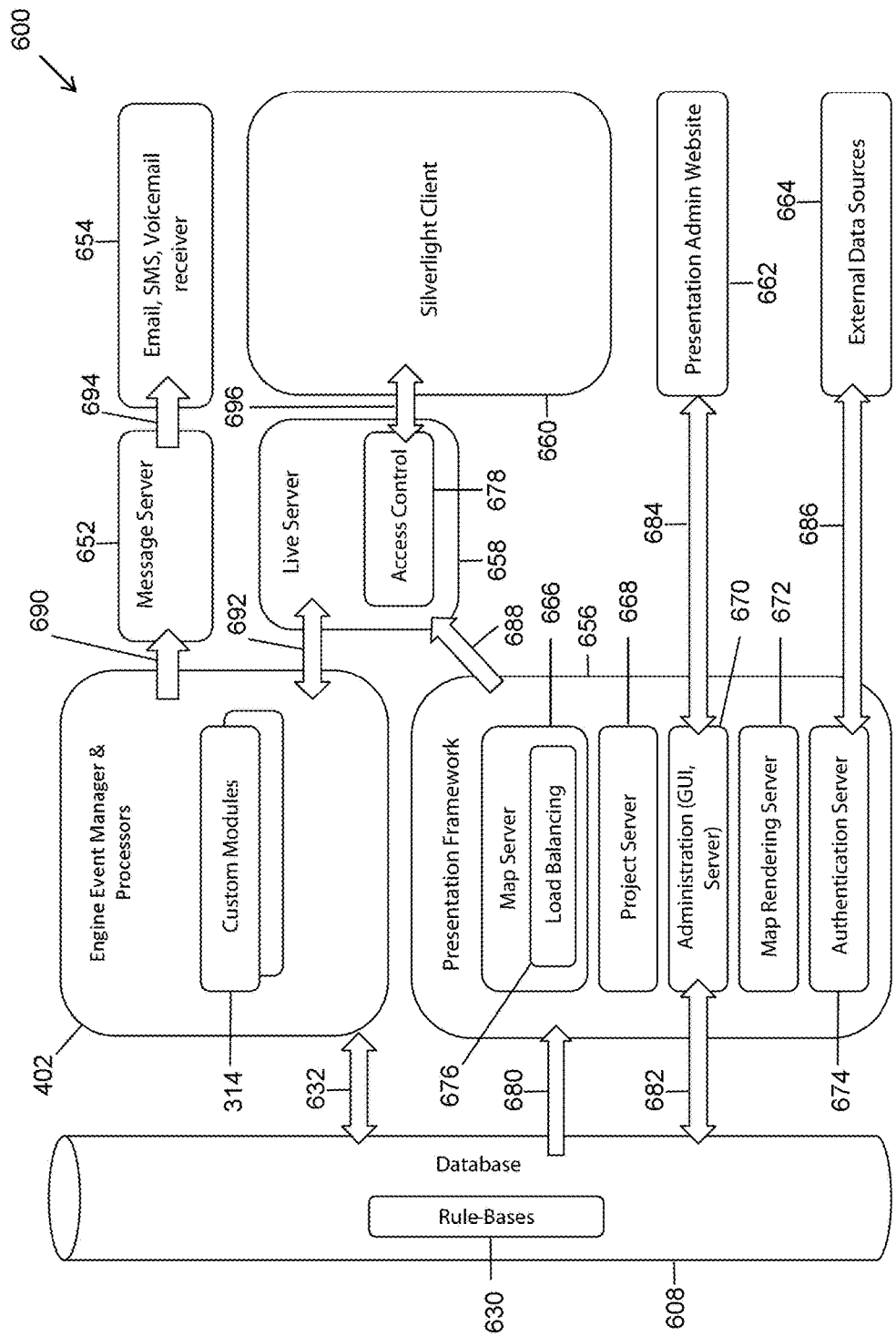
FIG. 12 is a schematic block diagram of another architecture according to an embodiment of invention.

Referring to FIG. 12, an example application 600 of the architecture of FIG. 6 is used as an asset monitoring system. In this application assets are monitored against threats. The solution architecture 600 comprises the engine 402 of FIG. 6 (including the event processor 302 and event manager 306), a database 608, a message server 652, a message receiver 654, a presentation framework 656, a live server 658, a graphical user interface 660, a presentation Admin website 662 and external data sources 664.

The engine 402 contains the custom modules 314 which are described further in relation to the FIG. 13 further below. The engine 402 accesses and provides information to the database 608 by communication 632. The database 608 comprises rule-bases 630. The engine 602 generates notification messages 690 which are sent to the message server 652. Message server 652 functions as the broadcaster and transmitter 270. It sends notifications over link 694 to the appropriate message receiver 656, which may be for example e-mail application 272, a short message service receiver 274 or voicemail receiver 278.

Engine 402 sends live environment information 692 to live server 658, which then provides information to the graphical user interface client 660. The graphical user interface client 660 is in this example is a Silverlight client, but it may be a Flash client or some other browser implementation.

Presentation framework 656 comprises a map server 666, a project server 668, an administration component 670, a map rendering server 672 and an authentication server 674. The authentication server 674 authenticates access to the external data sources 664. The administration component 670 allows for control of the presentation framework 656 and stores parameters in the database 608. The administration component 670 is accessed from presentation Admin website 662. Map server 666 includes load balancing 676. The map server 666 and map rendering server 672 generate one or more maps for the live server 658 to provide to the GUI client 660 to display to a user. The project server 668 manages predefined projects which are structured framework for graphically presenting and manipulating the resulting engine information.

Figure 13:
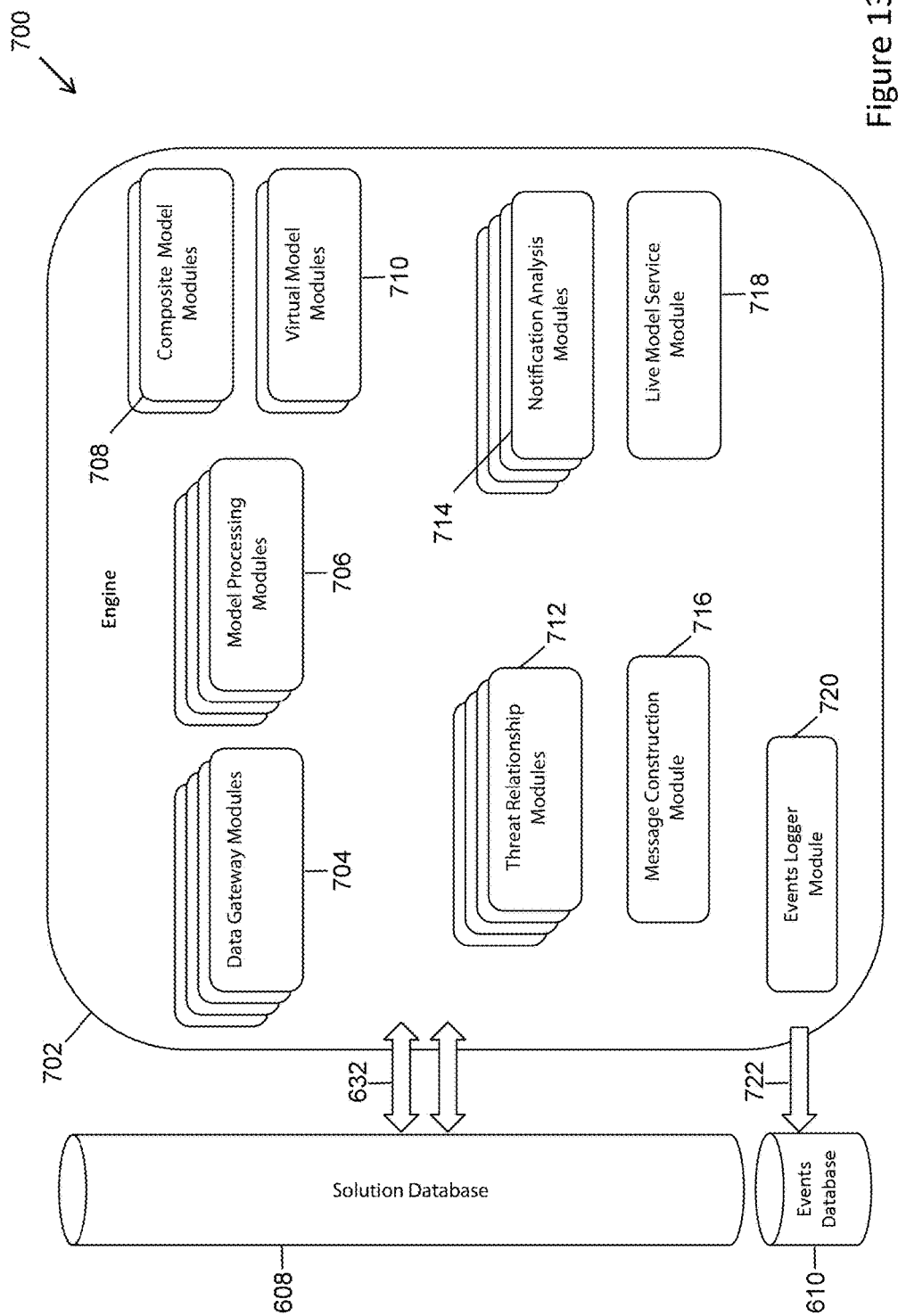
FIG. 13 is a schematic block diagram showing an engine portion of the solution architecture FIG. 12.

FIG. 13 shows the modules within the asset threat monitoring system implementation of engine 402 in more detail. The modules are again implemented as plug-ins and comprise the following: data gateway modules 704, model processing models 706, composite model modules 708, virtual model models 710, threat relationship modules 712, message construction module 716, live model service module 718 and events logger module 720.

The data gateway modules 704 operate as the gateways 154 to format incoming data into a standard format. There is one module 704 for each data source. The model processing modules 706 operate as the model processor 104. Each module 706 generates a model of an asset being monitored. The composite model modules 708 generate modules which are composite in nature, and based on two or more data sources. For example, an asset being modelled might be for example a power-line. A power-line model is constructed using one of the models 706. A bushfire (wildfire) might also be modelled based on a combination of measurement data. A satellite hotspot model may be created to receive satellite data and to model "hotspots". However a hotspot is not necessarily regarded as a bushfire. Bushfire warnings may be generated by a firefighting service may also be available. The bushfire model may require measurement data in the form of the hotspot data and the bushfire warning.

The virtual model module 710 creates and updates models of things that are only indirectly related to the real-life thing or are only indirectly related to the real-life thing. For example the bushfire might be modelled based on the combination of the hotspot model and the bushfire warning. In this case the model is based in part on another model and not directly on measured information.

The threat relationship modules 712 operate as the relationship processor 112 and analyses relationships between the models to create relationship representations and properties of the relationships. Those relationships that generate alerts create events that go to the notification analysis modules 714, which operate as the alert processor 120. Those alerts that require notification use the message construction module 716 to generate a notification. Thus the message construction module 716 operates as the notification message constructor 124. The live model service module 718 generates the output to the live environment. Each of the events created by the modules is logged by the events logger module 720. These are stored in the events database 610.

Figure 14:
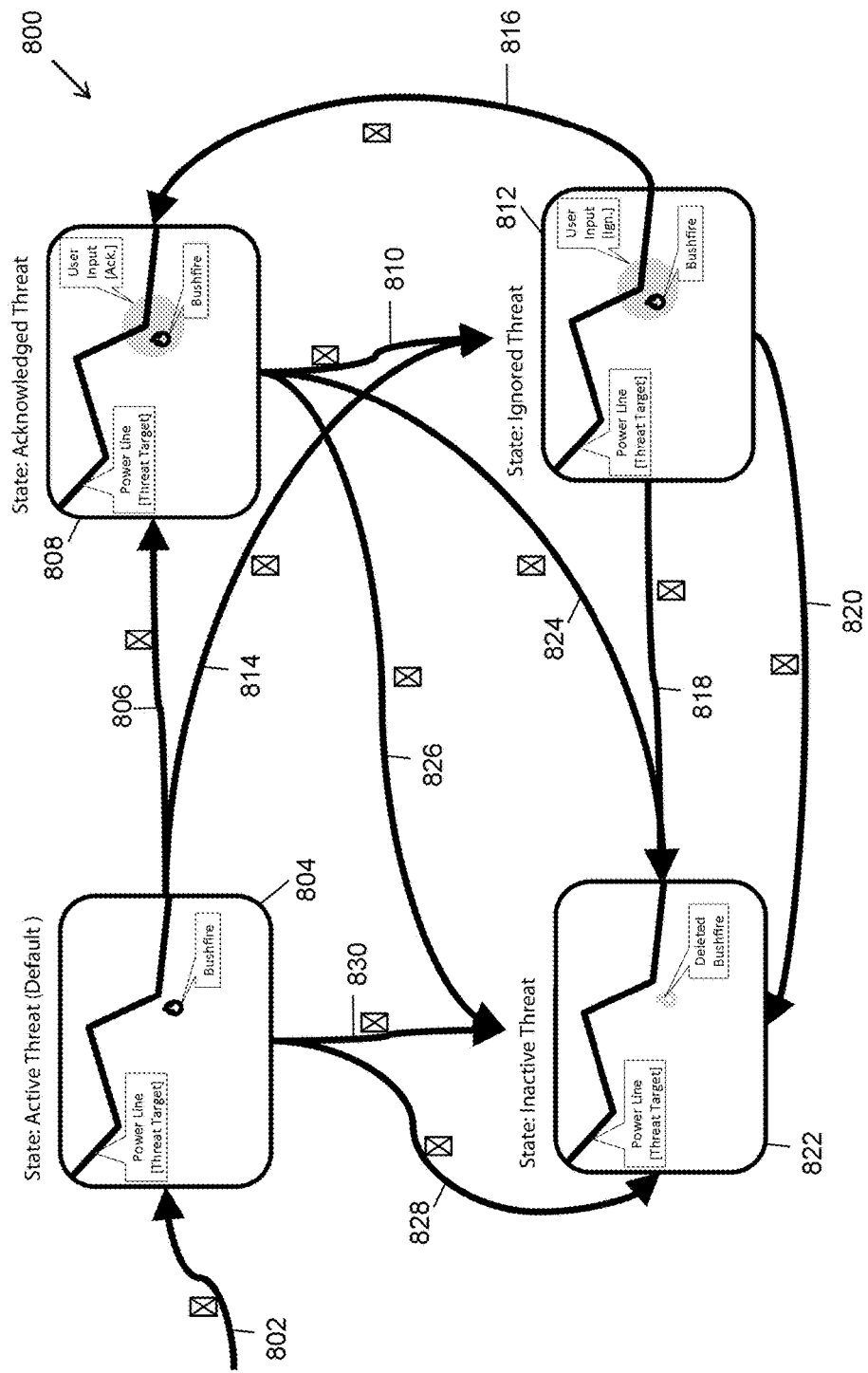
FIG. 14 is a state diagram example used in the architecture of FIG. 12.

An example list of real-life things that are modelled by this example are:

Satellite Derived Fires and associated swaths
Agency Reported Hazards
Fixed Assets
Administrative Areas and buildings
Mobile Assets
Weather Warnings
Lightning Strikes
Waves and Tidal Surges
Fires
Earthquakes
Floods
Weather Radars
Weather Observations
Cyclone Warning Areas
Cyclone Predicted Paths
Cyclone Tracks
Weather Forecast
Weather Model
User Input FIG. 14 shows a state diagram 800 implemented by a threat relationship state machine. The state machine has the following states: active threat 804, acknowledged threat 808, ignored threat 812 and inactive threat 822. A relationship may be created when a new fire model event triggers a relationship evaluation with a power-line model. The power-line is potentially threatened target. If the new fire model sufficiently proximate to the power-line model, then the relationship is created. The creation of the relationship starts the state machine. Each state also has a small depiction of what might be displayed to a user of the live environment. State machine commences by transitioning 802 to the active threat state 802. The creation of this relationship will result the user being notified. User may respond by acknowledging the threat. A new "user input [acknowledged threat]" model event triggers a transition 806 to be acknowledged threat state 808. From the active threat state 804 or from the acknowledged threat state 808, a new "user input [ignore threat]" model event triggers and transition 814 or 810, respectively, to the ignored threat state 812. From the ignored threat state 812 a "user input [acknowledged threat]" model event triggers a transition 816 to the acknowledged threat state 808. If an input is not received within a defined time then the present state is decayed, such that from the active state 804 there is a transition 828, from the acknowledged threat state 808 there is a transition 826, and from the ignored threat state 812 is a transition 822, to the inactive threat state 822. Alternatively, if the fire model is updated so as to be deleted, this changes the relationship such that if the current state is the active threat state 804 there is a transition 830, or if the current state is the acknowledged threat state 808 there is a transition 824, or if the current state is the ignored threat state 812 there is a transition 818, to the inactive threat state 822.

Figure 15:
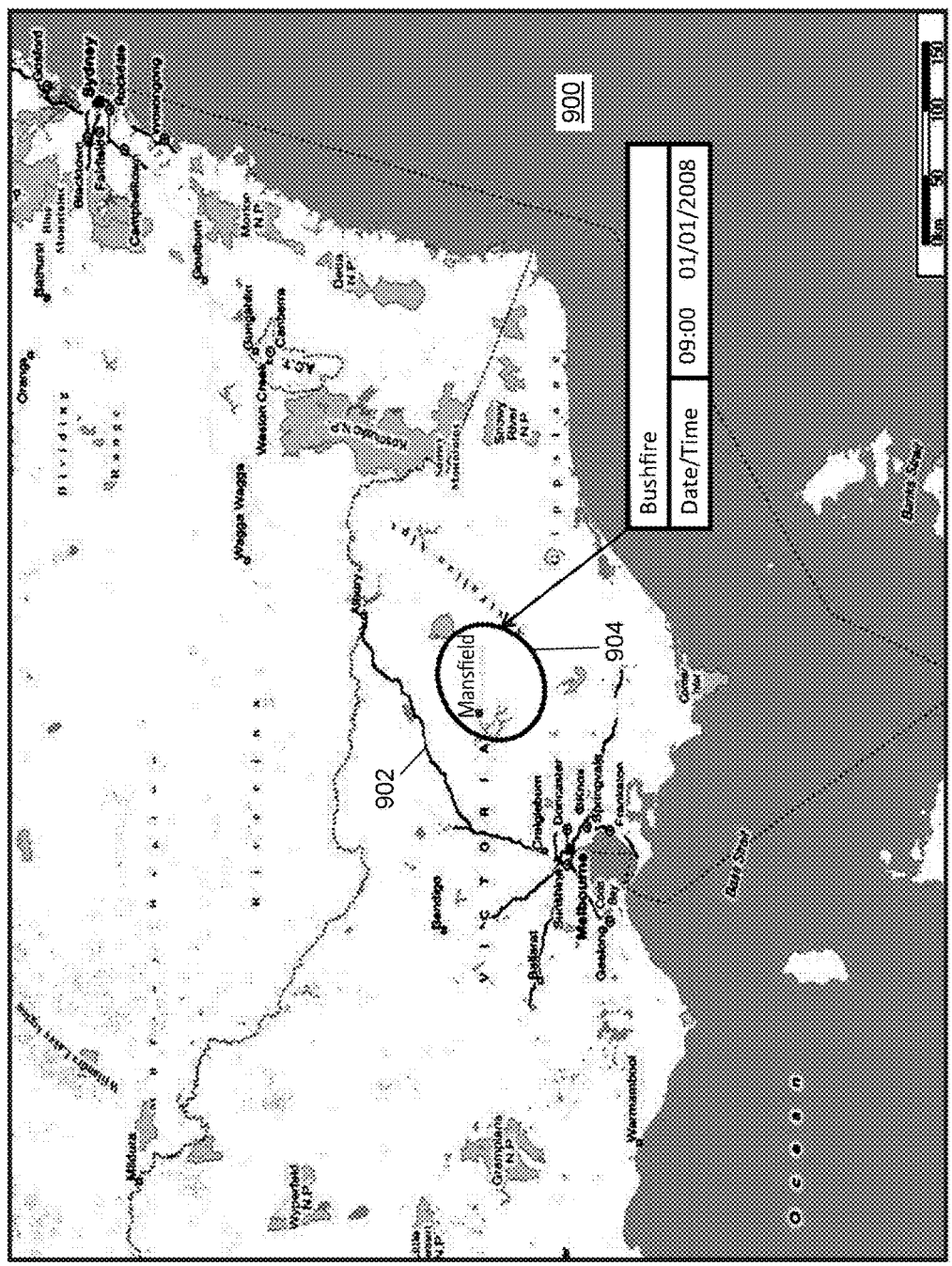
FIG. 15 is an example screenshot of a graphical user interface produced using the architecture of FIG. 12.

FIG. 15 shows a screenshot of a live environment GUI in which a map 900 is shown. On the map is a power-line 902 between the cities of Melbourne and Albury. Also shown is an area marked 904 which is annotated 906 as being a bushfire with a time and date. The bushfire 904 is proximate a portion of the power-line 902. This will trigger generation of relationship between the power-line 902 and the bushfire 904.

Figure 16:
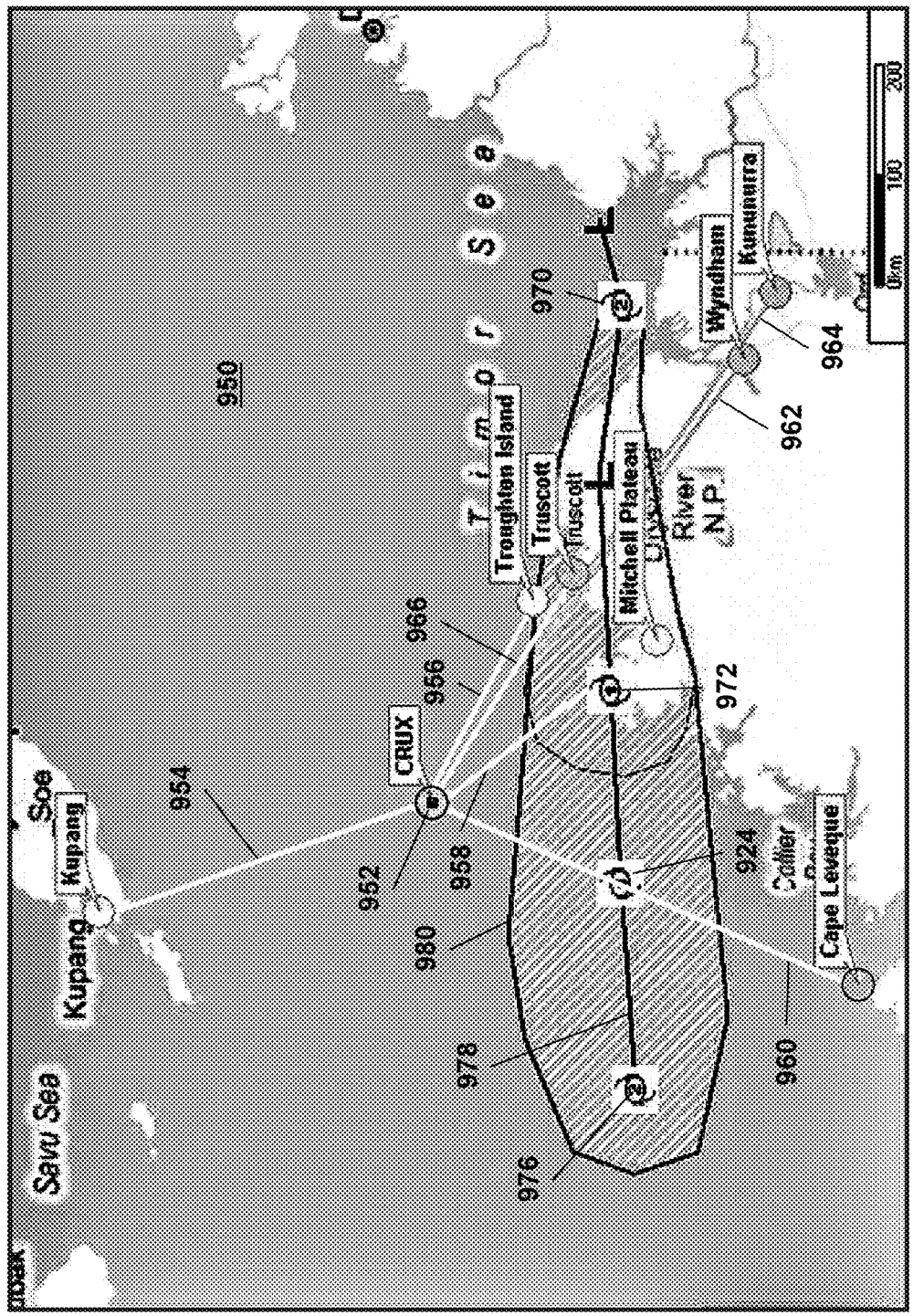
FIG. 16 is another example screenshot of a graphical user interface produced using architecture of FIG. 12.

FIG. 16 shows a screenshot of live environment GUI, in which a map 950 is shown. On the map is a sub-sea drilling rig "Crux" 952. A low pressure cell is shown degenerating into a category 2 cyclone marked as 970. The movement of the cyclone is tracked as it translates across the map to a position where is a category 1 cyclone, marked 972. The proximity of the cyclone to rig 952 triggers a relationship and subsequent notification with a warning to evacuate personnel on the rig 952. A series evacuation routes 954, 956, 958, 960, 962, 964, 966 are plotted within the range of an evacuation helicopter at which there are suitable landing sites. Some plots cross the path of the cyclone and are therefore ruled out. Plot 960 may be a sufficiently ahead of the cyclone when it is at position 972, however preparation time and travel time may rule this route out as well. Furthermore, predicted cyclone positions 974 and 976, may also rule out route 960. An area of affect of the cyclone is marked as 980. Travel within this area by helicopter would not be permitted.

Figure 17:
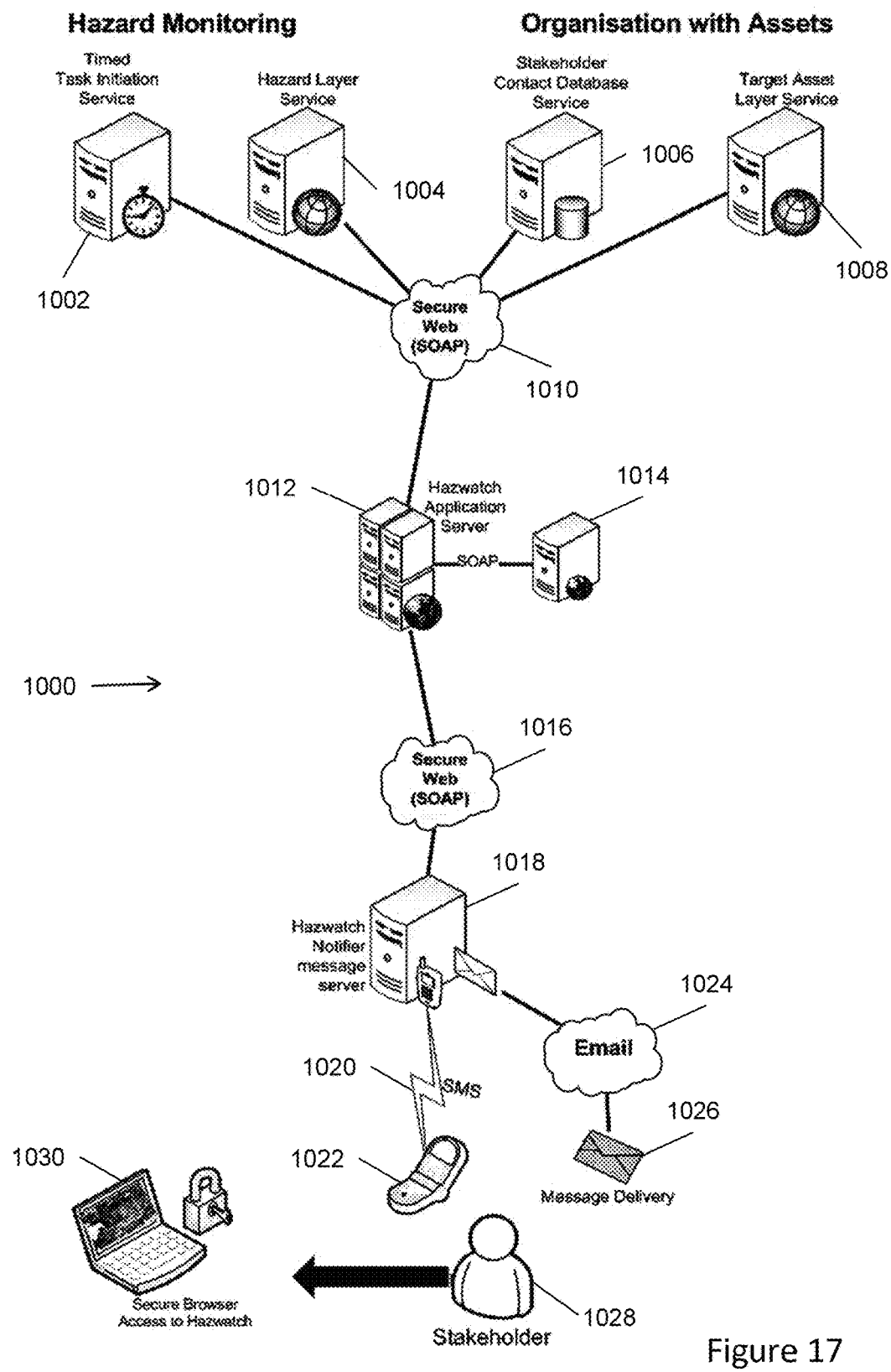
FIG. 17 is a schematic diagram of system according to an embodiment of invention.

Referring to FIG. 17, there is shown in further embodiment of a system 1000 for generating alerts. The system 1000 comprises a time configuration input 1002, a hazard data input service 1004, a stakeholder contact database service 1006, a target asset service 1008, communication medium 1010, an application server 1012, administration service 1014, communication medium 1016, a notifier 1018, a telecommunication service 1020, mobile device 1022, email transfer medium 1024, email receiver 1026, stakeholder 1028 and Web service browser 1030.

The time configuration input 1002 configures the updating of data input and/or alert checking. The input data service 1004 receives measurement data of hazards to assets. Stakeholder contact database service 1006 contains contact details for stakeholders 1028. This may be for example information to enable contact of the stakeholder by telecommunication service 1020 or e-mail 1024. The target asset service 1008 defines the position of assets to be monitored against hazards. Communication medium 1010 receives information from systems 1002, 1004, 1006 and 1008 and sends these to the application server 1012.

The application server 1012 monitors for proximity between the measured location data relating to hazards and the location of assets from systems 1002 and 1004, respectively. A hazardous relationship is regarded to exist when the proximity of the hazard and asset are too close. This generates an alert, which is sent across communication medium 1016 to server 1018. Application server 1012 may be administered via administration service 1014.

The alert triggers notification message server 1018 to generate a notification based on the contact details provided by server 1006. For example, the message is send to mobile device 1022 over telecommunication service and/or and email is sent to e-mail receiver 1026 via email transfer medium 1024. This message relating to the hazard threatening the asset can then be drawn attention of the stakeholder 1028, who can take action. The stakeholder can also monitor the hazard over the secure browser access 1030, which maps the location of the assets and hazards to provide visual indication to the stakeholder of the relationship between the hazard and asset.

Filtering may be applied to the alerts, such that alerts are only maintained in predetermined conditions. A notification is only sent when the alert is maintained. The input 1002 can configure the period in which processing of the measurement data occurs. The input 1002 can also configure the period between processing the measurement data.

Figure 18:
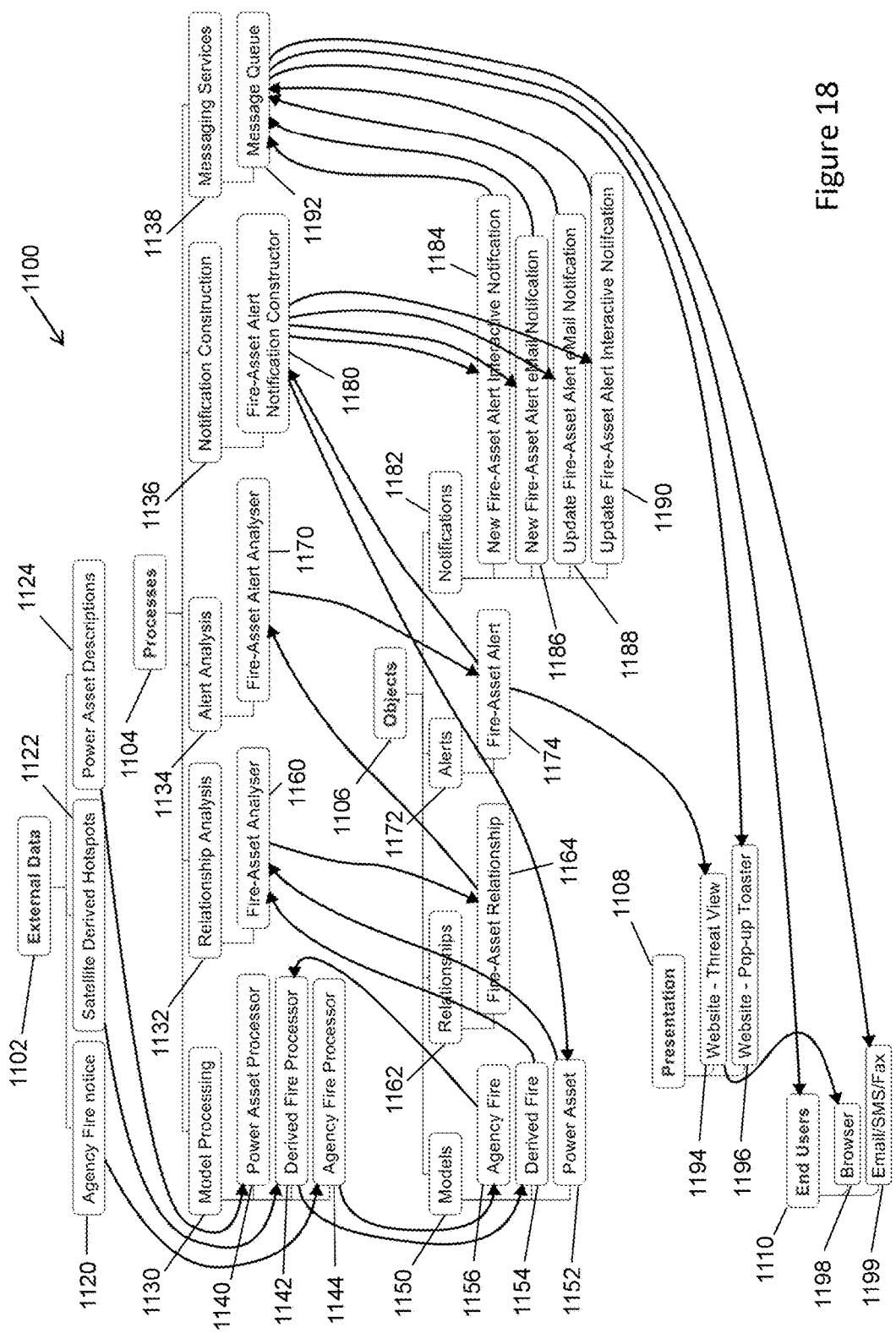
FIG. 18 is a diagram of a fire threat monitoring system according to an embodiment of the invention.

An example of asset monitoring 1100 from fire threats is described below in relation to FIG. 18. The asset monitoring 1100 may be implemented using the application 600, or by other another system described above. The system has an input or inputs for receiving external data 1102, a number of processes 1104, a storage or memory for storing objects data 1106, a presentation process 1108 for presenting notifications to end users 1110. The objects data 1106 is information defining the characteristics of objects. The objects are at least models, relationships or alerts, as described above.

The objects broadcast information detailing their changes in state as Events. These Events are of three main types and are classified as follows:

| Event Type | Description |
| --- | --- |
| New Object | This Event is broadcast by an Object when it has been newly created. |
| Updated Object | This Event is broadcast by an Object when one of its Characteristics changes. |
| Archived Object | This Event is broadcast by an Object when it has been deleted. |

The external data 1102 comprises agency fire notices 1120, satellite derived hotspots 1122, and asset descriptions 1124. The agency fire notices 1120 are obtained from a database maintained by or constructed from information provided by emergency service agencies (for example a fire fighting department). This data comprises descriptions of fires of interest. Each fire description comprises a time identified, a name (or other identifier), a status of the fire (for example out-of-control, under-control, contained) and a geographic area or extent. This data may arrive with a frequency of about once per 5 minutes to once per 6 hours.

The satellite derived hotspots 1122 comprise regions indicating a fire in or derived from an imaged captured by a satellite. The data is in the form of latitude and longitude, and confidence. The data is obtained from various ground stations after each satellite overpass. This data may be provided at about 3-6 hour intervals.

The asset descriptions 1126 comprise data describing assets of interest, in this case powerlines. The descriptions comprise a name and unique identifier of the asset, a spatial geometry of the asset and location of the asset. This information may be provided by the owner of the asset about every 3-12 months.

The processes 1104 comprise a model processor 1130, a relationship processor 1132, an alert processor 1134, a notification processor (notifier) 1136 and a messaging services processor 1138. These processors create update and archive the objects by maintaining the object data 1106 according the new Events.

The model processor 1130 comprises a number of sub-processors, namely a power asset processor 1140, a fire processor 1142, and an agency fire processor 1144. Each of the model sub-processors processes the relevant external data 1102 as is arrives, after a period of time or when a predefined signal is received. The model sub-processors add, update or archive models 1150 based on criteria, namely evaluation of respective model rules, and assign or update model characteristics.

Model Characteristics:

Model Type Identifier

Model Identifier

Geometry in Geographic Coordinate System

Valid Time Period

Current State

Collection of properties

The power asset processor 1140 creates or updates a powerline asset model 1152 for each asset in response to receiving the power asset descriptions 1124.

Power Asset Model Template

| Characteristic | Description |
| --- | --- |
| Identifier | Unique identifier for the Power Asset (as provided by the asset owner) |
| Geo graphic Area/ Geometry | Point, Line or Polygon representing the shape and location of the Power Asset |
| Valid Time Period | From last update to now |
| Current State | Active or Inactive |
| Property1 | Owner: The name of the Asset Owner |
| Property2 | Type: The Type of Power Asset (i.e. Overhead Power Line, Underground Power Line, Electricity Sub Station) |
| Property3 | Voltage: The voltage that Electric Power is being transmitted through the Power Asset. |
| Notification Timestamp | List of Notification Profile Identifier-Timestamp pairs representing the last time a notification was sent for each Notification Profile for this Model. |

The agency fire processor 1144 creates and updates agency fire models 1156 based on the agency fire notices 1120. When a new agency fire notice 1120 is received (fetched or an update sent) for each identified fire, if an agency fire model having the same identifier does not exist then a new agency fire model is created and assigned characteristics according to the agency fire notice (eg the location). When a model 1156 already exists the characteristics are updated. When a fire is no longer detailed within an agency fire notice 1120 the agency fire model is archived.

Agency Fire Model Template

| Characteristic | Description |
| --- | --- |
| Type Identifier | 001 |
| Identifier | Name |
| Geometry | Polygon of fire boundary |
| Valid Time Period | From creation time until now |
| Current State | Fire Status (controlled, going, not controlled, etc . . . ) |
| Property1 | Source: Agency Name |
| Property2 | Type: Fire type (i.e. grassfire) |

Model Example

| Characteristic | Value |
| --- | --- |
| Identifier | Southern Hills 23 |
| Geometry | Polygon of fire boundary |
| Valid Time Period | 2009-09-21 12:01 to 2009-09-22 8:00 |
| Current State | controlled |
| Source | GeoMac |
| Type | Grassfire |

In one example, the derived fire processor 1142 creates and updates a derived fire model 1154 based on the satellite fire models 1154 based on hotspot data and agency fire models 1156 according to a set of rules.

In this example the derived fire models are created based on the characteristics of other models, that is, a satellite model and an agency fire model. Another way of producing derived fire models is to process all the satellite hotspot data 1122 and the agency fire notices 1120 to produce composite fire models. A further way to produce a derived fire model is to determined relationships between the satellite models and the agency fire models based on proximity and or overlapping geographic location and from those relationships to create the derived fire models. Which of these techniques is used may depend on the specific objectives of the implementation.

Derived Fire Model Template

| Characteristic | Description |
| --- | --- |
| Identifier | Name (i.e. Southern Hills 23) for named fires |
| Geographic area | Aggregated polygon of fire boundary |
| Valid Time Period | From original source creation time until now |
| Current State | Fire Status (controlled, going, not controlled, etc . . . ) |
| Property1 | Sources: Agency Names, Satellite etc |
| Property2 | Type: Fire type (i.e. grassfire) |
| Property3 | Confidence: Likelihood of being a fire |
| Property4 | Remarks: any comment from sources |

The relationship processor 1132 adds, updates or deletes relationships 1162 in response to model events (ie creation, update or archive of a model 1150). The relationship processor 1132 identifies models 1150 that are in a relationship based on relationship criteria and calculates relationship properties.

In this implementation the relationship criteria are configured to monitor for threats to the power assets from fires. Thus the relationship processor 1132 is configured to operate as a fire-asset analyser 1160. The fire-asset analyser 1160 is configured to assess if relationship criteria are met when a new derived fire model is created and if so to create a new fire-asset relationship 1164 between the respective derived fire model 1154 or agency fire model 1156 and the relevant power asset model 1152 and calculate the fire-asset relationship's properties. The derived fire model/agency fire model 1154/1156 and the power asset model 1152 are regarded as members of the relationship 1164.

When a fire model 1154 or 1156 is updated:
If the fire model is a member of an existing fire-asset relationship then
the relationship criteria is assessed and
if met then the fire-asset relationship is updated
if not met then the fire-asset relationship is deleted
If the fire model is not a member of an existing fire-asset relationship then
the relationship criteria is assessed and if met then a new fire-asset relationship is created and properties are calculated
For archive derived fire model Events: if the derived fire model is a member of an existing fire-asset relationship then the relationship is deleted.
Relationship General Characteristics:
Unique Relationship Type Identifier
Unique Relationship Identifier
Relationship Criteria (identifies members)
Model Members (Relationship must have a Member cardinality of at least 2)
Relationship Properties (defined by the Member Relationships. i.e. closest members, min distance between members of different types, new derivative Models)
Example Relationship Properties Profile
Relation Type Identifier: 001
Criteria: Power Asset Models (A,B,C) of type X within 5000 m of a Derived Fire Model (1) form the relationships 1ABC
Members: 1 Derived Fire Model, 1 or more Power Asset Model
Properties: Active=TRUE, Calculated minimum distance between the Derived Fire Model member and a Power Asset Model member
The alert analysis processor 1134 assesses an alert criteria in respond to a relationship event (when a new relationship is created, when a relationship is updated or when a relationship is deleted). The alert analysis processor 1134 generates an alert 1172 and calculates alert properties if the alert condition is met. In this implementation the alert analysis processor 1134 is configured to operate as a fire-asset alert analyser 1170. The fire-asset alert analyser 1170 is configured to consider fire-asset relationship events.

For a new fire-asset relationship event, the fire-asset alert criteria is assessed and if met then a new fire-asset alert 1174 is created and properties are calculated.

For an update fire-asset relationship event:
    If a fire-asset relationship is the source of an existing fire-asset alert then
        the alert criteria is assessed and
            if met then the fire-asset alert is updated
            if not met then the fire-asset alert is deleted
    If a fire-asset relationship is not the source of an existing fire-asset alert then
        the fire-asset alert criteria is assessed and if met then a new fire-asset alert is created and properties are calculated.

For archive fire-asset relationship events:
    If the fire-asset relationship is the source of an existing fire-asset alert then the alert is deleted Alert General Characteristics:
Unique Alert Type Identifier
Unique Alert Identifier
Source Relationship
Alert Rule Conditions Met
Alert Properties (derived or calculated from Source Relationship and its Members)
Alert Properties Profile
Relation Type Identifier: 001
Source Relationship: Fire-Asset Relationship
Alert Rule Conditions: Relationship is active
Alert Properties:
Calculated minimum distance between the Derived Fire Model and a Member Power Asset Model
Derived fire model Member Identifier
List of Power Asset Model Member Identifier
Example:
Alert Type Identifier: 0000021
Alert Identifier: 00009898
Minimum Distance: 421 m
Fire: Southern Hill 23
Power Assets: CKY, SMS, SVA, MSA, MSV, RBW, MSN, BRT, TYN, KLV The notification construction processor 1136, in response to alert events (creation, update or deletion of an alert) identifies relevant notification profiles, assesses notification criteria (i.e. Re-warn Interval), constructs a notification message content, updates model's notification timestamps and generate notifications 1182.

In this implementation notifications are sent to a power asset's owner (relevant person(s) or warning/monitoring system) when a fire threatens an asset according to a specified profile. The notification construction processor 1136 is configured to act as a fire-asset alert notification constructor 1180 such than in response to new fire-asset alert events:
    For each notification profile having a source fire-asset alert
        A new fire-asset notification 1184 or 1186 is created
        For each unique power asset model (A) listed in fire-asset alerts
            The fire-asset notification criteria is assessed (such as re-warn interval is less than the time since last fire-asset notification for power asset model A)
            A fire-asset notification message content is added
            A notification timestamp list is updated for power asset model (A)

The notification construction processor 1136 is configured such than in response to update fire alert events
    For each notification profile having a source fire-asset alert
        An update fire-asset notification 1188 or 1190 is created
        For each unique power asset model (A) listed in fire-asset alerts
            The fire-asset notification criteria is assessed (such as re-warn interval is less than the time since last fire-asset notification for the power asset model A)
            A fire-asset notification message content is added
            A notification timestamp list is updated for power asset model (A)

Notification General Characteristics:
Unique Notification Profile Identifier
Unique Notification Identifier
Time Sent
Time Generated
Delivery Type [SMS, eMail, Interactive]
Message Content
New eMail Notification Profile:
Source Alert: Fire-Asset Alert
End User: User-1 (Asset Manager), User-2 (Rostered Network Controller)
Service Delivery type: eMail
Message Template: <Subject> <Message Content> <Footer>
Re-warn Interval: 10 minutes
Event Type: New
Update eMail Notification Profile:
Source Alert: Fire-Asset Alert
End User: User-1 (Asset Manager), User-2 (Rostered Network Controller)
Service Delivery type: eMail
Message Template: <Subject> <Message Content> <Footer>
Re-warn Interval: 10 minutes
Event Type: Update
Update Interactive Notification Profile:
Source Alert: Fire-Asset Alert
End User: User-1 (Asset Manager), User-2 (Rostered Network Controller)
Service Delivery type: Interactive
Message Template: <Subject> <Message Content> <Footer>
Re-warn Interval: 1 minutes
Event Type: Update
New Interactive Notification Profile:
Source Alert: Fire-Asset Alert
End User: User-1 (Asset Manager), User-2 (Rostered Network Controller)
Service Delivery type: Interactive
Message Template: <Subject> <Message Content> <Footer>
Re-warn Interval: 1 minutes
Event Type: Update The messaging services processor 1138 is configured so that in response to new notification events. A notification 1182 is allocated to a message queue 1192 based on "Delivery Type" and delivery of messages from message queue is managed. The message queue is configured such that in response to new fire-asset notifications:
- If Delivery Type="SMS" then place the notification on the SMS Delivery Queue
- If Delivery Type="eMail" then place the notification on the eMail Delivery Queue
- If Delivery Type="Interactive" then broadcast the notification for use by a Website—Pop-up Toaster 1196 of the presentation processor 1108.

The SMS Queue management:
- Takes the next notification from the front of the SMS Delivery Queue
- Delivers the notification message to the user's SMSDeliveryAddress
- Updates the SMS Delivery Queue The eMail Queue management:
- Takes the next notification from the front of the eMail Delivery Queue
- Delivers the notification message to the User's eMailDeliveryAddress
- Updates the eMail Delivery Queue The SMS and eMail Delivery Queues send the notification 1182 to the user's mobile telephone, or eMail address, respectively. In an alternative, the notification 1182 is sent to a facsimile machine.

Figure 19:
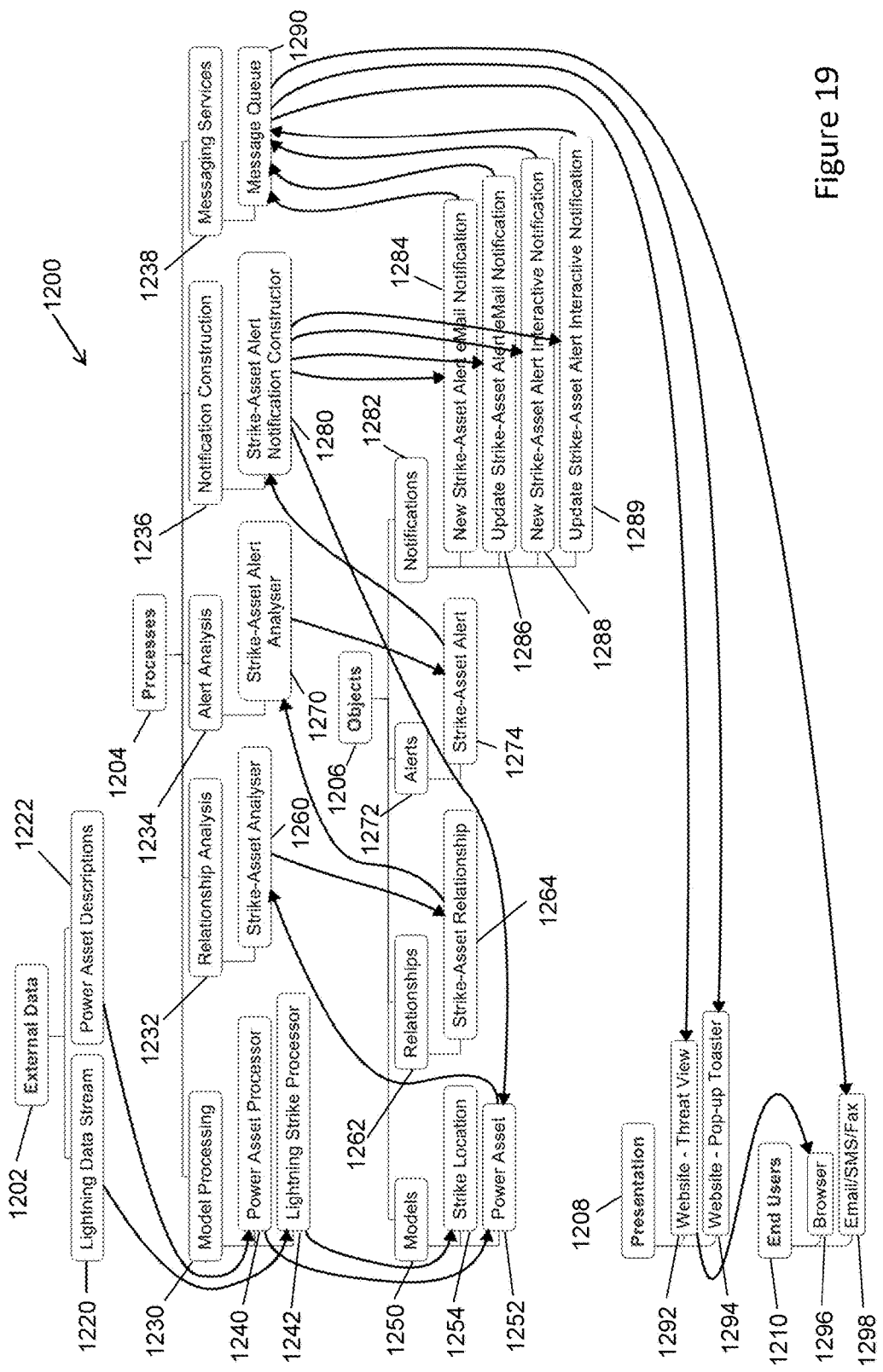
FIG. 19 is a diagram of a lightning monitoring system according to an embodiment of the invention.

An example of asset monitoring 1200 from lightning threats is described below in relation to FIG. 19. The asset monitoring 1200 may be implemented using the application 600, or by other another system described above The system has an input or inputs for receiving external data 1202, a number of processes 1204, a storage or memory for storing objects data 1206, a presentation process 1208 for presenting notifications to end users 1210.

The external data 1202 comprises a lightning data stream 1220 and asset descriptions 1222. The lightning data stream 1220 is provided by a source in a digital form in real time. The lightning data stream 1220 comprises textual properties including time of strike, amplitude, type and a spatial point (latitude, longitude) and a geographic location.

The asset descriptions 1222 comprise data describing assets of interest, in this case powerlines, microwave towers or other assets vulnerable to a lightning strike. The descriptions comprise a name and unique identifier of the asset, a spatial geometry of the asset and location of the asset. This information may be provided by the owner of the asset about every 3-12 months.

The processes 1204 comprise a model processor 1230, a relationship processor 1232, an alert processor 1234, a notification processor 1236 and a messaging services processor 1238.

The model processor 1230 comprises a number of sub-processors, namely a power asset processor 1240 and a lightning strike processor 1242. Each of the model sub-processors processes the relevant external data 1202 as is arrives, after a period of time or when a predefined signal is received. The model sub-processors add, update or archive models 1250 based on criteria, namely evaluation of respective model rules, and assign or update model characteristics.

The power asset processor 1240 creates or updates a power asset model 1252 for each asset in response to receiving the power asset descriptions 1222.

The lightning strike processor 1242 creates or updates a strike location model 1254 for each lightning strike in response to receiving the lightning data stream 1220.

In response to new lightning data from the lightning data stream 1220:
- Create a new Strike Location Model 1254 based on the received Lightning Data.
- Set the Model Expiry Time as 10 minutes after the model has been created. (Once this is reached the model will be deleted)
- When the Strike Location Model Expiry Time is greater than or equal to now, delete the Strike Location Model 1254.

Strike Location Model Template

| Characteristic | Description |
|---|---|
| Type Identifier | 004 |
| Identifier | Name |
| Geometry | Point representing Strike Location |
| Valid Time Period | 10 Minutes from creation time |
| Current State | Strike Status (based on TTL) |
| Property1 | Type: (Cloud to Cloud, Cloud to Ground) |
| Property2 | Amplitude: Amplitude of the measured Lightning Strike |

Model Example

| Characteristic | Value |
|---|---|
| Identifier | Strike 3003 |
| Geometry | Point representing Strike Location |
| Valid Time Period | 2009-09-20 06:08 to 2009-09-20 06:18 |
| Current State | 50% |
| Type | Cloud to Ground |
| Amplitude | 40 kA |

A model for the location of a cloud to ground Lightning Strike incorporates properties of the source and a point geometry and is of interest for a finite period defined by a decay rule.

Strike-Asset Alert Example:
Alert Type Identifier: 0000043
Alert Identifier: 00009987
Minimum Distance: 312 m
Power Asset: CKY
Strike Locations: 212, 213, 217, 218, 220

The relationship processor 1232 adds, updates or deletes relationships 1262 in response to model events based on relationship criteria and calculates relationship properties.

In this implementation the relationship processor 1232 is configured to operate as a strike-asset analyser 1260 such that the relationship criteria are configured to monitor for threats to the power assets from lightning strikes.

In response to new Strike Location Model Events
Relationship Criteria is assessed and if met a new Strike-Asset Relationship 1264 is created and properties are calculated For Delete Strike Location Model Events:
If the Strike Location Model 1254 is the only remaining Strike Location Model member of an existing Strike-Asset Relationship 1264 then the relationship is deleted Example Relationship Profile
Relation Type Identifier: 001
Criteria: Power Asset Model (A) of type X within 5000 m of Strike location Models (1,2,3) form the relationship (A123)
Members: 1 Power Asset Model, 1 or more Strike Location Models
Properties: Active=TRUE, Calculated minimum distance between the Strike Location Model member and a Power Asset Model member The alert analysis processor 1234 assesses an alert criteria in response to a relationship event and generates an alert 1264 and calculates alert properties if the alert condition is met. In this implementation the alert analysis processor is configured to operate as a Strike-Asset Alert Analyser 1270 configured to consider strike-asset relationship events.

In response to new Strike-Asset Relationship Events
    Strike-Asset Alert Criteria is assessed and if met new Strike-Asset Alerts 1274 are created and properties are calculated In response to Update Strike-Asset Relationship Events:
    If Strike-Asset Relationship 1264 is the Source of an existing Strike-Asset Alert 1274
        Alert Criteria is assessed and
            if met then Strike-Asset Alerts are updated
            if not met then Strike-Asset Alerts are deleted
    If Strike-Asset Relationship 1264 is not the Source of an existing Strike-Asset Alert 1274 then
        Strike-Asset Alert Criteria is assessed and if met then new Strike-Asset Alerts 1274 are created and properties are calculated For Delete Strike-Asset Relationship Events:
    If Strike-Asset Relationship 1264 is the Source of an existing Strike-Asset Alert 1274 then the Alert is deleted Example Alert Profile
Relation Type Identifier: 010
Source Relationship: Strike-Asset Relationship
Alert Rule Conditions: Relationship is active
Alert Properties:
Calculated minimum distance between the Member Power Asset Model and a Member Strike Location Model
Power Asset Model Member Identifier
List of Strike Location Model Member Identifiers The notification construction processor 1236, in response to alert events identifies relevant notification profiles, assesses notification criteria, constructs notification message content, updates the model's notification timestamps and generates notifications 1282. In this implementation notifications are sent to a power asset's owner when a lightning strike may affect a power asset according to a specified profile. The notification construction processor 1236 is configured such than in response to new strike-asset alert events.

The messaging services processor 1238 is configured so that in response to new notification events a notification 1282 is allocated to a message queue 1290 and delivered to the user.

Modifications and variations as would be apparent to a skilled person are intended to fall with in the scope of the present invention.

The invention claimed is:

1. In a processing system a method comprising:
receiving measurement data;
processing the measurement data to create or update at least two models and one or more characteristics associated with each model based on the measurement data, where each of the models is a representation of a real-world thing;
processing the characteristics associated with the models to form one or more new relationships between the models when the characteristics are such that two or more of the models are regarded as being related according to one or more relationship criteria; and
processing the relationships to generate one or more alerts when one or more of the relationships meet one or more alert criteria.

2. A method comprising:
categorising received measurement data as related to one or more models and storing the categorised data in association with the related one or more models in a storage device, wherein each of the one or more models is a representation of a real-world thing, wherein one or more of the models have one or more associated characteristics that are based on the related measurement data;
forming one or more new relationships between the models when the characteristics are such that two or more of the models are regarded as related according to one or more relationship criteria and storing the formed relationships in association with the related two or more models in the or another storage device; and
generating one or more alert signals when one or more of the relationships meet one or more alert criteria.

3. The method of claim 2, wherein one or more of the relationships have one or more properties that are based on the model characteristics or the measurement data related to the model in the respective relationship and generating the one or more alerts occurs when one or more of the relationship properties meet one or more of the alert criteria.

4. The method of claim 3, wherein one or more of the characteristics comprise a current state which is derived or inferred from measurement data related to the respective model.

5. The method of claim 4, wherein one or more of the relationship properties comprise a current state which is derived or inferred from measurement data related to the respective models that have the respective relationship and/or characteristics of the respective models.

6. The method of claim 3, wherein the method further comprises creating a new model in the event that the relationship properties meet one or more other model creation criteria and a model related to the real-world things represented by the models does not exist.

7. The method of claim 3, wherein the method further comprises updating one or more characteristics based on one or more of the relationship properties.

8. The method of claim 2, wherein at least a portion of the measurement data has a geographic or geo-spatial significance of the real-world thing.

9. The method of claim 2, wherein generation of the alert triggers sending a notification to an actor.

10. The method of claim 2, wherein the method further comprises creating a new model in the event that the received measurement data meet trigger criteria for creation of a model representing a real-world thing.

11. The method of claim 2, wherein the method further comprises creating a new model in the event that the model characteristics meet one or more model creation criteria for creation of a new model representing a real-world thing.

12. The method of claim 2, wherein the method further comprises updating one or more characteristics based on the characteristics of the one or more other models.

13. The method of claim 2, wherein each formed relationship is associated with at least one possible alert corresponding to a possible interaction between the models defining said relationship.

14. The method of claim 2, wherein one or more of the relationships have one or more properties that are reflective of a relationship between the real-world things being modelled by the two or more models between which each said relationship is formed.

15. The method of claim 2, wherein each alert relates to a condition between at least two of the models that represent real-world things, said at least two models being models between which one or more relationships were formed, said one or more formed relationships being those which met alert criteria when said alert was formed.

16. The method of claim 2, wherein one of the relationships is a proximity between the modelled real world things.

17. The method of claim 2, wherein one or more of the models is a representation of an environmental phenomenon.

18. The method of claim 2, wherein the characteristics associated with one or more of the models comprise a prediction based on the data in relation to the real-world thing.

19. The method of claim 2, wherein each of the models is a representation of distinct real-world things.

20. The method of claim 2, wherein each real-world thing is a real-world object.

21. A system comprising:
 an input for receiving measurement data;
 a model processor for creating one or more models based on the received measurements data and for maintaining one or more characteristics of the models based on the measurement data, wherein each of the one or more models is a representation of a real-world thing;
 a relationship processor for forming one or more new relationships between the models when one or more of the characteristics are such that two or more of the models are regarded as being related according to one or more relationship criteria; and
 an alert processor for generating one or more alerts when one or more of the relationships meet one or more alert criteria.

22. The system of claim 21, further comprising a received data processor for categorising the measurement data as being related to one or more models.

23. The system of claim 21, further comprising a memory for maintaining a record of the one or more characteristics and properties of the one or more relationships.

24. The system of claim 21, wherein the model processor is configured to operate as one or more state machines, each state machine tracking the current state of a respective model.

25. The system of claim 21, wherein the relationship processor is configured to operate as one or more state machines, each state machine tracking the current state of respective relationships between models.

26. The system of claim 21, further comprising a notifier for notifying an actor when an alert is generated.

27. The system of claim 26, wherein the notifier comprises a message constructor for providing the actor with a message as part of the notification, wherein the message constructor is configured to construct the message from one or more of: the relationships related to a model which caused the alert, the characteristics of the models in the relationship which caused the alert, or the measurement data on which the characteristics are based that were used to form the relationship which caused the alert.

28. The system of claim 21, further comprising an event processor for controlling the processors and transferring event messages between the processors.

29. The method of claim 21, wherein each formed relationship is associated with at least one possible alert generated by the alert processor corresponding to a possible interaction between the models defining said relationship.

30. The method of claim 21, wherein one or more of the relationships have one or more properties that are reflective of a relationship between the real-world things being modelled by the two or more models between which each said relationship is formed.

31. The method of claim 21, wherein each alert generated by the alert processor relates to a condition between at least two of the models that represent real-world things, said at least two models being models between which one or more relationships were formed, said one or more formed relationships being those which met alert criteria when said alert was formed.

32. The method of claim 21, wherein one of the relationships is a proximity between the modelled real world things.

33. The method of claim 21, wherein one or more of the models is a representation of an environmental phenomenon.

34. The method of claim 21, wherein the characteristics associated with one or more of the models comprise a prediction based on the data in relation to the real-world thing.

35. The method of claim 21, wherein each real-world thing is an object.

36. A method comprising:
 receiving measurement data;
 processing the measurement data to be categorised as being related to one or more models of a real-world thing, wherein the one or more related models are associated with a geographical characteristic based on the measurement data, wherein each geographic characteristic comprises an area or volume of relevance and a geographic location of the area or volume of relevance;
 processing the geographical characteristics associated with the models to determine whether any of the areas or volumes of relevance intersect or are within a specified proximity; and
 generating an alert when there is an intersection or the volumes of relevance are determined to be within the proximity.

37. A system comprising:
 a receiver of measurement data;
 a processor for processing the measurement data to be categorised as being related to one or more models of a real-world object, event or phenomenon, wherein the one or more related models are associated with a geographical characteristic based on the measurement data, wherein each geographic characteristic comprises an area or volume of relevance and a geographic location of the area or volume of relevance;
 a processor for processing the geographical characteristics associated with the models to determine whether any of the areas or volumes of relevance intersect or are within a specified proximity; and
 a processor for generating an alert when there is an intersection or the volumes of relevance are determined to be within the proximity.

38. A system comprising:
 an object creator which triggers creation of a plurality of objects, each object being created when input data meets object creation criteria, wherein the created objects are at least two models of a real-world things, at least one new relationship between the models and an alert generator;
 a processor module for each of the created objects, each processor module receives data, processes the data including applying criteria to the received data, and stores the processed data; and at least one electronic processor configured to execute the processor module for each of the created objects;

wherein when the created object is a model object, the received data is measurement data, the criteria is one or more rules that reflect that the measurement data is relevant to a characteristic of the real-world thing represented by the model and the stored data is characteristics of the model based on the measurement data;

wherein when the created object is a relationship object, the received data is the model characteristics, the criteria is one or more rules that reflect that the real-world thing of one model has an influence over, relevance to or is related to the real-world thing of another model and the stored data is relationship properties based on the relevant model characteristics, wherein when the created object is an alert generator object, the received data is the relationship properties, the criteria is one or more rules that reflect the relationship between the modelled real world things is significant and the stored data is an alert based on the relationship properties.

39. A computer implemented method comprising:

triggering creation of a plurality of objects, each object created when input data meets object creation criteria, wherein the created objects are at least two models of a real-world things, at least one new relationship between the models and an alert generator; and for each of the created objects, receiving data, processing the data including applying criteria to the received data, and storing the processed data;

wherein when the created object is a model object, the received data is measurement data, the criteria is one or more rules that reflect that the measurement data is relevant to a characteristic of the real-world thing represented by the model and the stored data is characteristics of the model based on the measurement data;

wherein when the created object is a relationship object, the received data is the model characteristics, the criteria is one or more rules that reflect that the real-world thing of one model has an influence over, relevance to or is related to the real-world thing of another model and the stored data is relationship properties based on the relevant model characteristics, wherein when the created model is an alert generator object, the received data of the relationship properties, the criteria is one or more rules that reflect the relationship between the modelled real world things is significant and the stored data is an alert signal based on the relationship properties.

40. A system for tracking hazards or environmental phenomena comprising:

an input for receiving measurement data;

a model processor for creating or updating two or more models based on the received measurement data and for maintaining one or more characteristics of the models based on the data, wherein one or more of the models is a representation of a real-world hazard or environmental phenomenon and one or more of the models is a representation of a real-world asset, wherein the characteristics of each model include spatial geographic characteristics;

a relationship processor for forming one or more new relationships between the models when one or more of the characteristics are such that one or more of the models representing real-world hazards or environmental phenomena and one or more of the models representing real-world assets are regarded as being related according to one or more relationship criteria, wherein the relationship criteria include a relationship spatial proximity between one of said models representing real-world hazards or environmental phenomena and one of said models representing real-world assets; and an alert processor for generating one or more alerts when one or more of the relationships meet one or more alert criteria, wherein said alert criteria include an alert spatial proximity between one of said models representing real-world hazards or environmental phenomena and one of said models representing real-world assets in the one or more relationships.

41. A method for tracking hazards or environmental phenomena comprising:

receiving measurement data;

creating or updating two or more models based on the received measurement data and maintaining one or more characteristics of the models based on the data, wherein one or more of the models is a representation of a real-world hazard or environmental phenomenon and one or more of the models is a representation of a real-world asset, wherein the characteristics of each model include spatial geographic characteristics;

forming or updating one or more new relationships between the models when one or more of the characteristics are such that one or more of the models representing real-world hazards or environmental phenomena and one or more of the models representing real-world assets are regarded as being related according to one or more relationship criteria, wherein the relationship criteria include a relationship spatial proximity between one of said models representing real-world hazards or environmental phenomena and one of said models representing real-world assets; and generating one or more alerts when one or more of the relationships meet one or more alert criteria, wherein said alert criteria include an alert spatial proximity between one of said models representing real-world hazards or environmental phenomena and one of said models representing real-world assets in the one or more relationships.

* * * * *